US012383984B2

(12) United States Patent
Okuma et al.

(10) Patent No.: US 12,383,984 B2
(45) Date of Patent: Aug. 12, 2025

(54) LASER PROCESSING DEVICE

(71) Applicant: HAMAMATSU PHOTONICS K.K., Hamamatsu (JP)

(72) Inventors: Junji Okuma, Hamamatsu (JP); Mitsuhiro Nagao, Hamamatsu (JP); Norihiro Fukuchi, Hamamatsu (JP); Yasunori Igasaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/087,789

(22) PCT Filed: Mar. 28, 2017

(86) PCT No.: PCT/JP2017/012645
§ 371 (c)(1),
(2) Date: Sep. 24, 2018

(87) PCT Pub. No.: WO2017/170553
PCT Pub. Date: Oct. 5, 2017

(65) Prior Publication Data
US 2020/0298345 A1   Sep. 24, 2020

(30) Foreign Application Priority Data

Apr. 1, 2016  (JP) ................................ 2016-074426

(51) Int. Cl.
*B23K 26/53*   (2014.01)
*B23K 26/00*   (2014.01)
(Continued)

(52) U.S. Cl.
CPC .............. *B23K 26/53* (2015.10); *B23K 26/00* (2013.01); *B23K 26/064* (2015.10);
(Continued)

(58) Field of Classification Search
CPC .............. B23K 26/0648; B23K 26/083; G02F 1/133553
See application file for complete search history.

(56) References Cited

U.S. PATENT DOCUMENTS 6,577,429 B1 * 6/2003 Kurtz ..................... G02B 27/48
348/E9.026
7,209,279 B2 * 4/2007 Igasaki ................ G03H 1/2205
359/290
(Continued)

FOREIGN PATENT DOCUMENTS

| CN | 101902012 A | 12/2010 |
| CN | 102741011 A | 10/2012 |

(Continued)

OTHER PUBLICATIONS

U.S. Appl. No. 13/575,376, filed Jan. 2011, Sakamoto; Takeshi.*
(Continued)

*Primary Examiner* — Steven W Crabb
*Assistant Examiner* — Fahmida Ferdousi
(74) *Attorney, Agent, or Firm* — Faegre Drinker Biddle & Reath LLP

(57) ABSTRACT

A laser processing device configured to emit laser light on an object to perform laser processing of the object, the laser processing device including: a laser output unit configured to output the laser light; a spatial light modulator configured to reflect the laser light output from the laser output unit while modulating the laser light in accordance with a phase pattern; and an objective lens configured to converge the laser light from the spatial light modulator toward the object, in which the spatial light modulator includes an entrance surface, a reflective surface, and a modulation layer configured to display the phase pattern to modulate the laser light, and a dielectric multilayer film having a high reflectance (Continued)

region in a plurality of wavelength bands non-contiguous with each other is formed on the reflective surface.

2 Claims, 20 Drawing Sheets

(51) Int. Cl.
*B23K 26/06* (2014.01)
*B23K 26/064* (2014.01)
*B23K 26/08* (2014.01)
*B23K 103/00* (2006.01)
*G02F 1/1335* (2006.01)

(52) U.S. Cl.
CPC ........ *B23K 26/0648* (2013.01); *B23K 26/083* (2013.01); *G02F 1/133553* (2013.01); *B23K 2103/56* (2018.08)

(56) References Cited

U.S. PATENT DOCUMENTS

| | | | | |
|---|---|---|---|---|
| 10,181,376 B2 * | 1/2019 | Birnbach | ............ | B23K 26/064 219/121.73 |
| 2003/0010763 A1 * | 1/2003 | Fukuchi | ................. | G02B 27/46 219/121.75 |
| 2010/0295836 A1 * | 11/2010 | Matsumoto | .......... | G09G 3/2092 345/211 |
| 2012/0327501 A1 * | 12/2012 | Sakamoto | ............. | B23K 26/53 359/290 |

FOREIGN PATENT DOCUMENTS

| | | | | |
|---|---|---|---|---|
| CN | 103650264 A | 3/2014 | | |
| CN | 203992813 U | 12/2014 | | |
| CN | 104852269 A | 8/2015 | | |
| CN | 105190382 A | 12/2015 | | |
| CN | 105264411 A | 1/2016 | | |
| CN | 207071747 U | 3/2018 | | |
| JP | 3878758 B2 * | 2/2007 | ............. | G02F 1/135 |
| JP | 2007-264353 A | 10/2007 | | |
| JP | 2011-152562 A | 8/2011 | | |
| JP | 2012150510 A * | 8/2012 | | |
| JP | 2013-092688 A | 5/2013 | | |
| JP | 2013-128088 A | 6/2013 | | |
| JP | 5456510 B2 | 4/2014 | | |
| KR | 1020140084122 | 7/2014 | | |
| WO | WO 2013/061960 A1 | 5/2013 | | |

OTHER PUBLICATIONS

Krueger et al., Spatial light modulator system for application as a dynamic diffractive element and in optical image processing, 2000 (Year: 2000).*
Screenshot of Abrisatechnologies.com (Year: 2015).*
JP-2012150510-A (Year: 2012).*
Wang et al., "Theoretical Analysis of Spectral Selective Transmission Coatings for Solar Energy PV System", 2013 (Year: 2013).*
RP-Photonics, https://www.rp-photonics.com/gas_lasers.html, Mar. 25, 2016 (Year: 2016).*
Machine translation of JP-3878758-B2 (Year: 2007).*
Introduction to Polarization, edmundoptics.com (Year: 2015).*
Thorlabs, https://thorlabs.com/newgrouppage9.cfm?objectgroup_id=5840 (Year: 2015).*
Wang et al., "Theoretical Analysis of Spectral Selective Transmission Coatings for Solar Energy PV System", (Year: 2013).*
https://www.rp.photonics.com/gas_lasers.html, (Year: 2016).*
International Preliminary Report on Patentability mailed Oct. 11, 2018 for PCT/JP2017/012645.
Qian Miaogen, "Material surface technology and application manual 4.2 Dielectric reflective film 1-7," Beijing Machine Industry Publishing (China Machine Press), Nov. 30, 1998, p. 912 (including partial English-language translation).

* cited by examiner

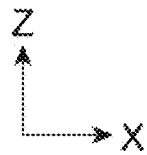
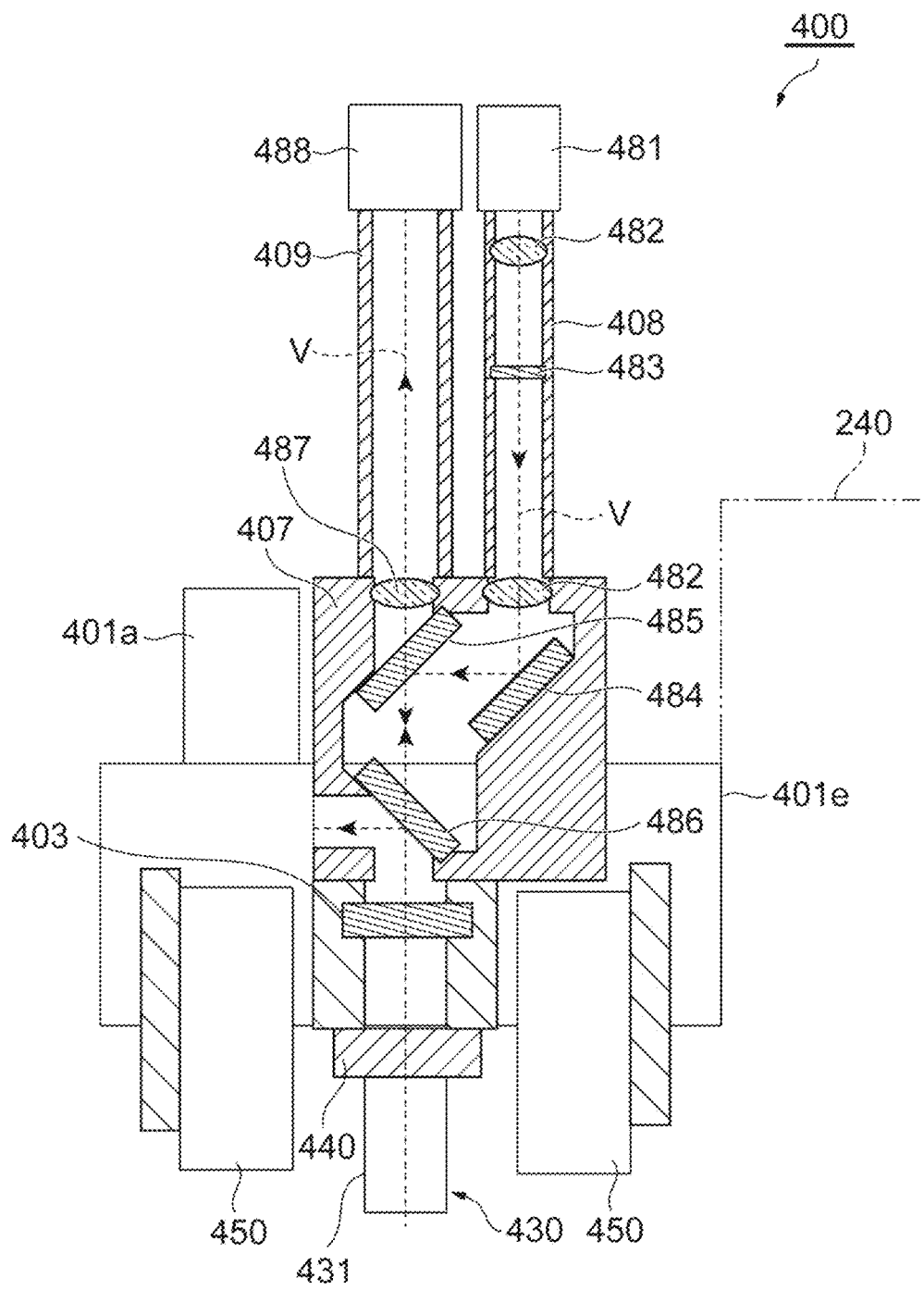

*Fig.16*
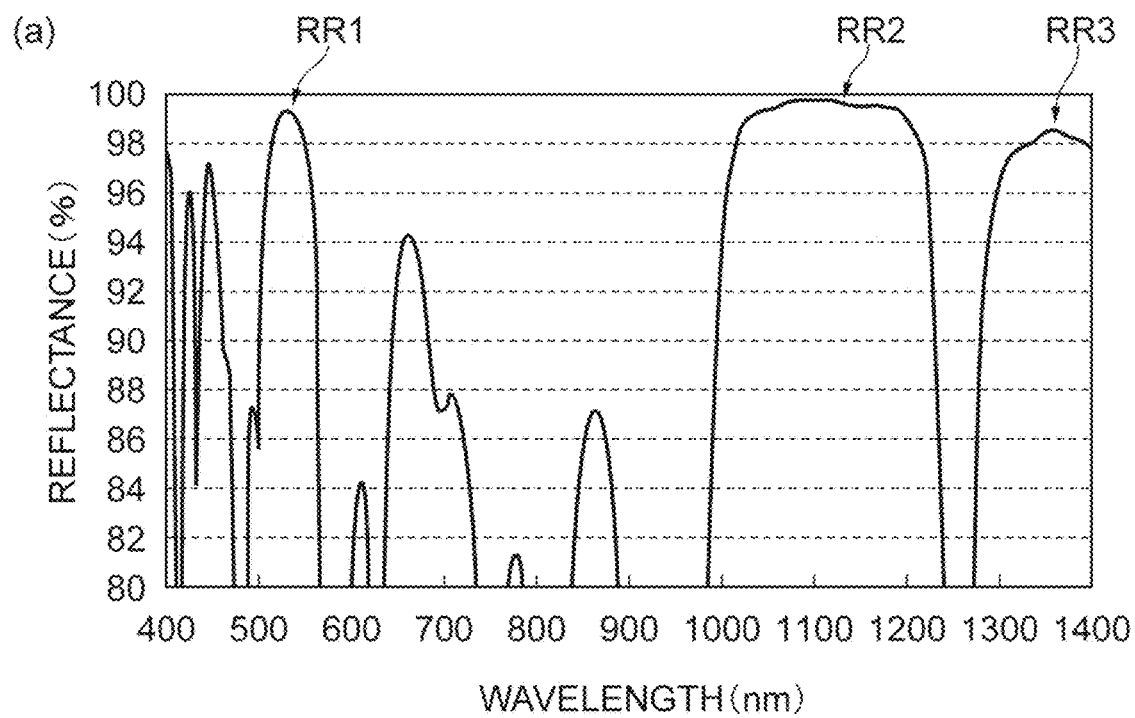
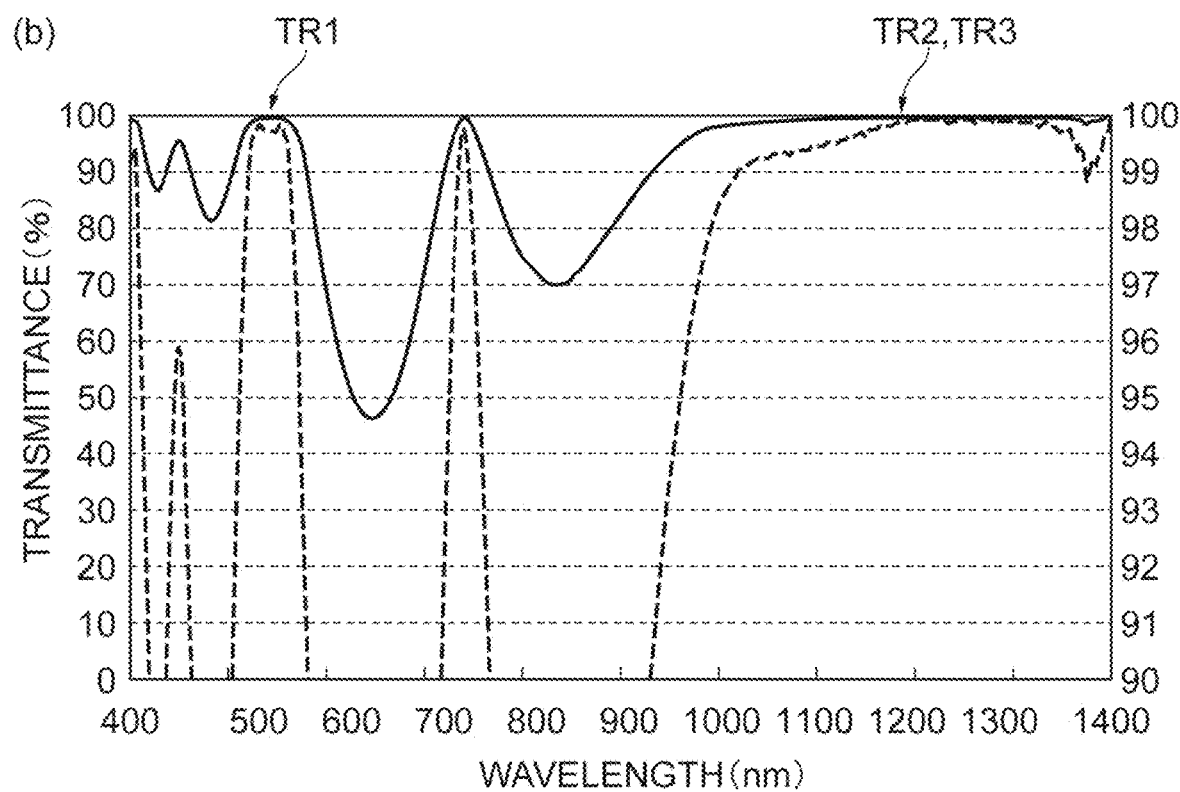

*Fig.17*
(a)
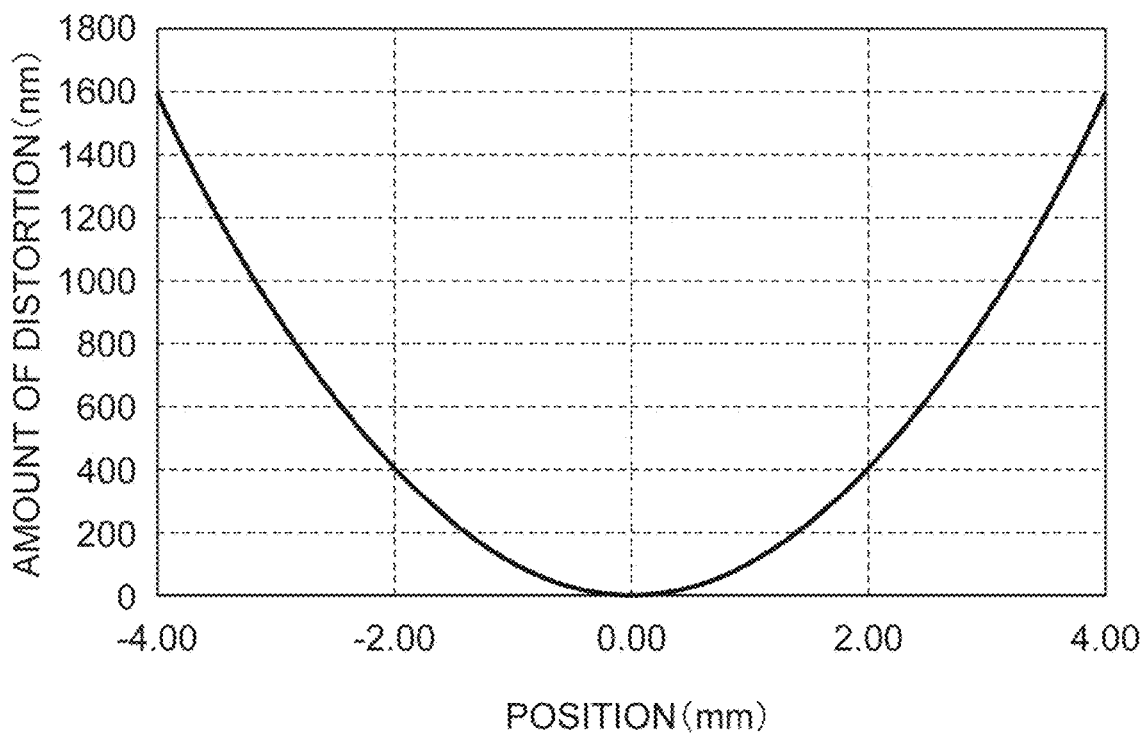
(b)
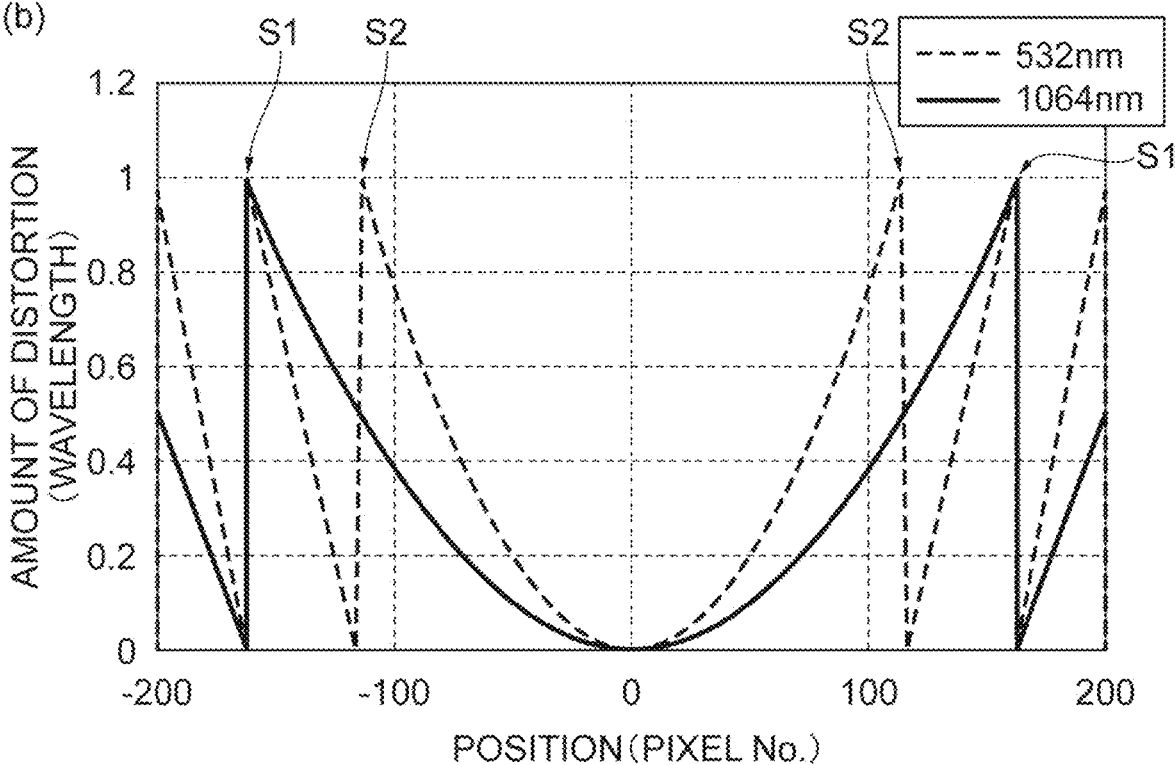

*Fig.18*
(a)
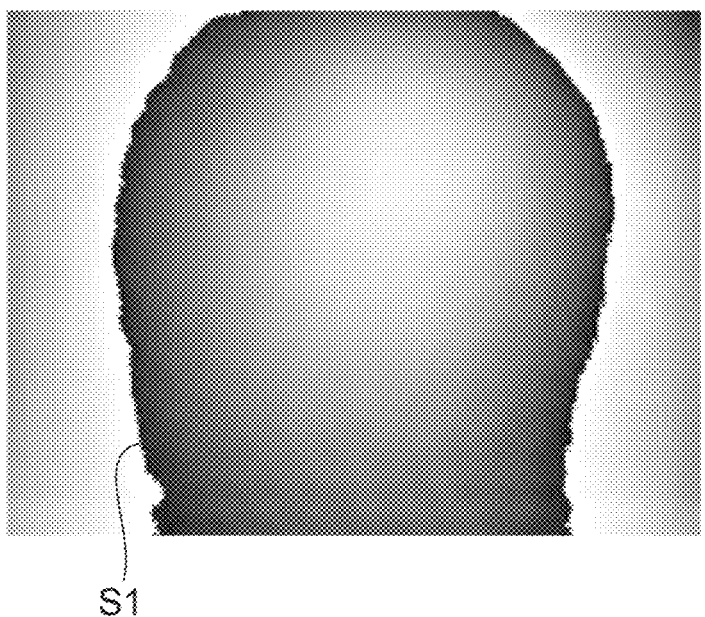
(b)
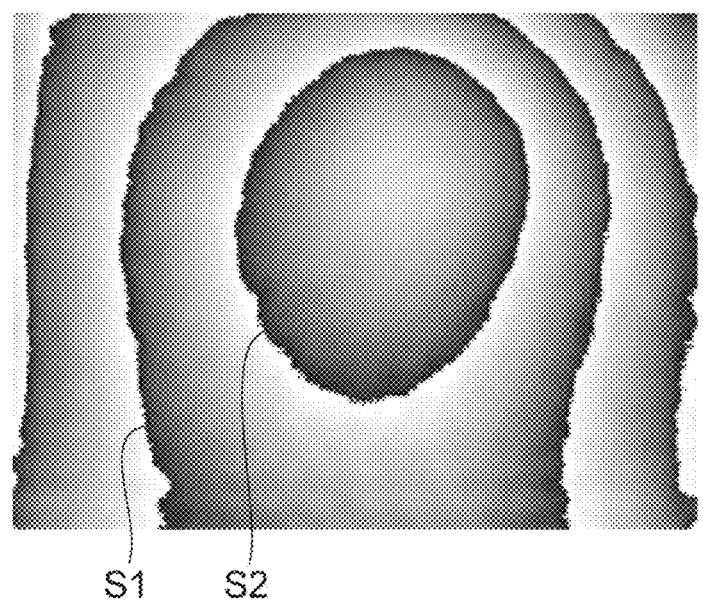

*Fig.19*
(a)
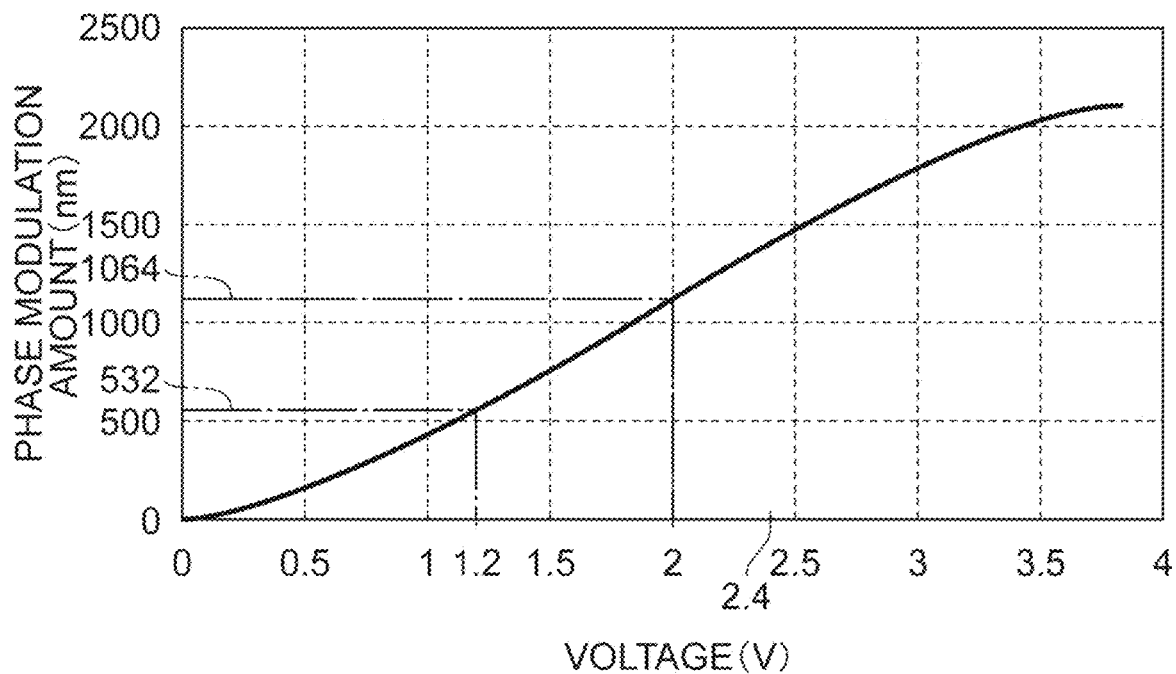
(b)
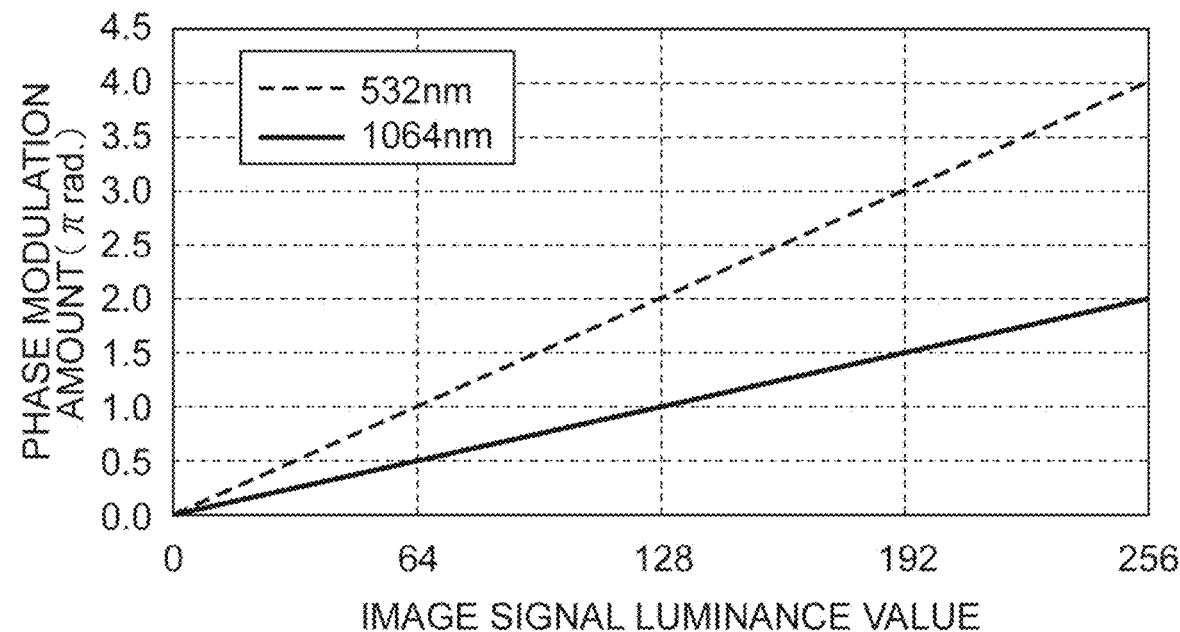

*Fig.20*
(a)
(b)
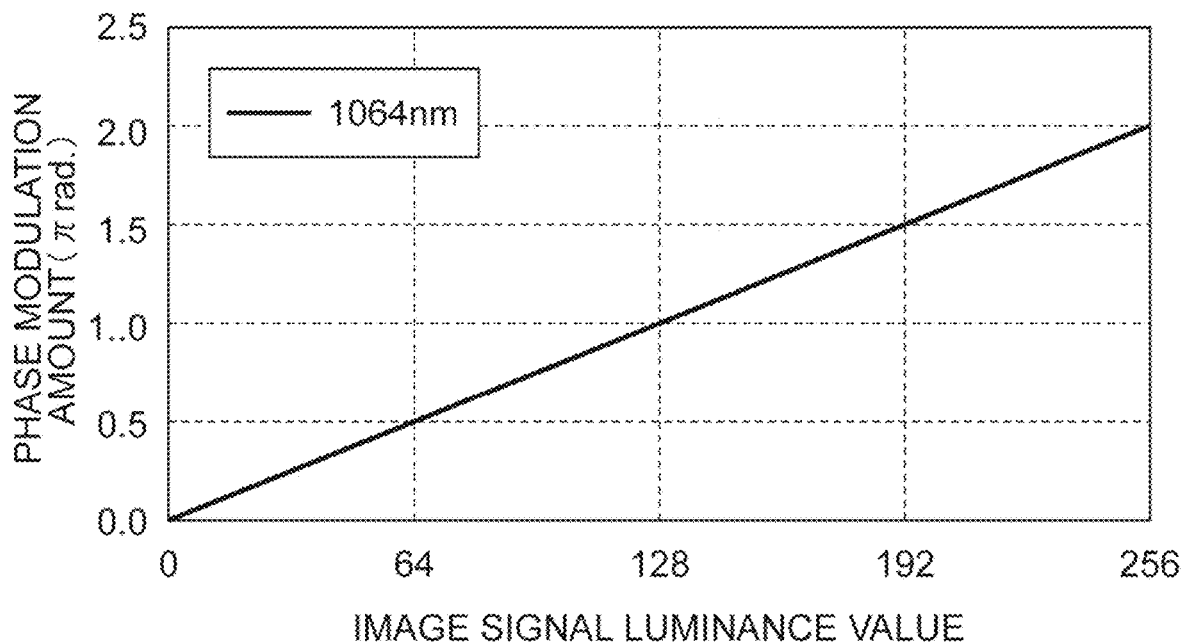
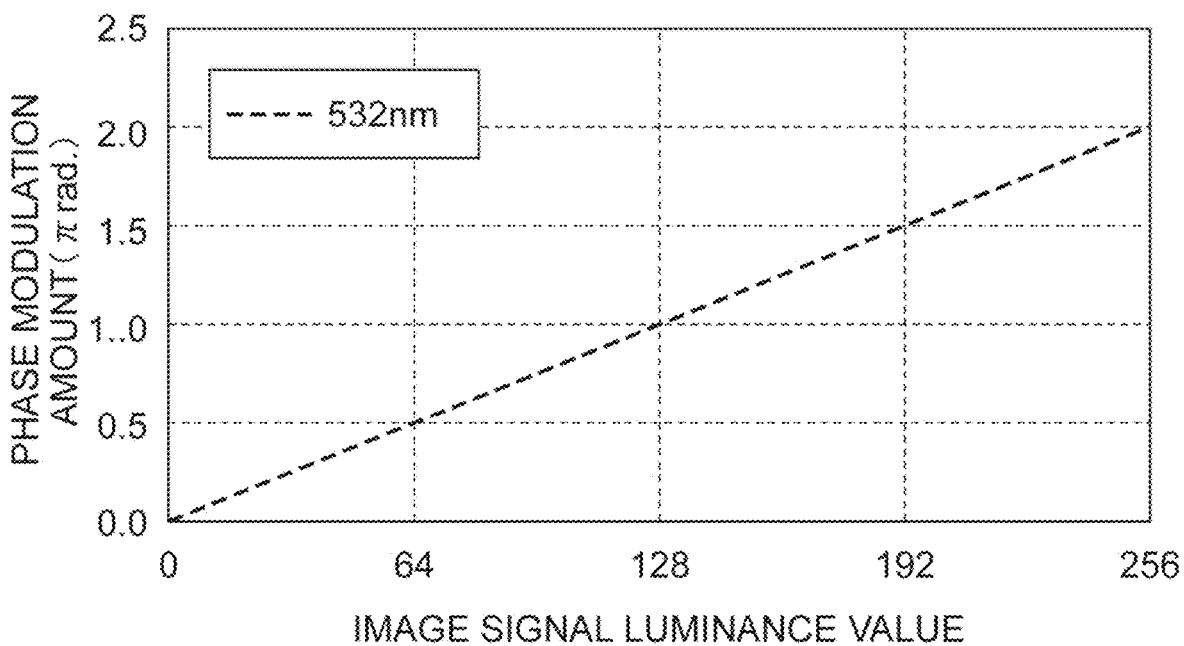

LASER PROCESSING DEVICE

TECHNICAL FIELD

One aspect of the present invention relates to a laser processing device.

BACKGROUND ART

Patent Literature 1 describes a laser processing device including a holding mechanism configured to hold a workpiece and a laser irradiation mechanism configured to irradiates the workpiece held by the holding mechanism with laser light. In the laser irradiation mechanism of the laser processing device, components arranged on an optical path of the laser light from a laser oscillator to a converging lens are arranged in one housing, and the housing is secured to a wall portion erected on a base of the laser processing device.

CITATION LIST

Patent Literature

Patent Literature 1: Japanese Patent No. 5456510

SUMMARY OF INVENTION

Technical Problem

In the laser processing device as described above, a wavelength of the laser light suitable for processing may vary depending on specifications of the object to be processed, processing conditions, and the like.

An object of one aspect of the present invention is to provide a laser processing device adaptable to a plurality of wavelength bands.

Solution to Problem

A laser processing device according to one aspect of the present invention is a laser processing device configured to emit laser light on an object to perform laser processing of the object, the laser processing device including: a laser output unit configured to output the laser light; a spatial light modulator configured to reflect the laser light output from the laser output unit while modulating the laser light in accordance with a phase pattern; and an objective lens configured to converge the laser light from the spatial light modulator toward the object, in which the spatial light modulator includes an entrance surface at which the laser light enters, a reflective surface configured to reflect the laser light entering from the entrance surface toward the entrance surface, and a modulation layer arranged between the entrance surface and the reflective surface and configured to display the phase pattern to modulate the laser light, and a dielectric multilayer film having a high reflectance region in a plurality of wavelength bands non-contiguous with each other is formed on the reflective surface.

In the laser processing device, the laser light is modulated in accordance with the phase pattern of the spatial light modulator, and then is converged toward the object by the objective lens. The spatial light modulator includes the entrance surface at which the laser light enters, the reflective surface configured to reflect the laser light entering from the entrance surface, and the modulation layer arranged between the entrance surface and the reflective surface. When entering from the entrance surface and passing through the modulation layer, the laser light is modulated in accordance with the phase pattern. In addition, the laser light is modulated also when reflected by the reflective surface and then again passing through the modulation layer, and is emitted from the spatial light modulator. Here, on the reflective surface, the dielectric multilayer film is formed having the high reflectance region in the plurality of wavelength bands non-contiguous with each other. Therefore, with the spatial light modulator, it is possible to modulate the laser light while reducing loss on the reflective surface of the laser light of the plurality of wavelength bands. Accordingly, the laser processing device is adaptable to the plurality of wavelength bands.

A laser processing device according to one aspect of the present invention may further include a pattern holding unit configured to hold a distortion correction pattern as the phase pattern for correcting distortion given to a wavefront of the laser light depending on flatness of the reflective surface, in which the pattern holding unit holds the distortion correction pattern different for each of the wavelength bands. Generally, the reflective surface of the spatial light modulator has a predetermined flatness for each spatial light modulator. However, to correct the distortion given to the wavefront of the laser light depending on the flatness, a phase modulation amount is required different depending on the wavelength. Therefore, as in this case, if the distortion correction pattern is held different for each of the wavelength bands, the laser processing device is easily and reliably adaptable to the plurality of wavelength bands.

A laser processing device according to one aspect of the present invention may further include a table holding unit configured to hold a table in which a luminance value of an image signal for displaying the phase pattern on the modulation layer and a phase modulation amount of the phase pattern are associated with each other, in which the table holding unit holds the table different for each of the wavelength bands. Here, for the laser light of a certain wavelength, a table is prepared in which luminance values of, for example, 256 gradations of the image signal are assigned to (associated with) the phase modulation amounts for one wavelength ($2\pi$), whereby a phase modulation pattern suitable for the wavelength can be easily displayed on the modulation layer.

However, if the same table is used for laser light having a wavelength shorter than the wavelength, luminance values of smaller gradations are used for the phase modulation amounts for one wavelength, so that reproducibility drops of the wavefront after the modulation. To cope with this, in this case, the table is held different for each of the wavelength bands. For this reason, it is possible to use a table suitable for each wavelength band, and degradation of the reproducibility of the wavefront can be suppressed.

In the laser processing device according to one aspect of the present invention, an antireflective film having a high transmittance region in the plurality of wavelength bands may be formed on the entrance surface. In this case, the loss of the laser light can be further reduced, and the laser processing device is reliably adaptable to the plurality of wavelength bands.

In the laser processing device according to one aspect of the present invention, the plurality of wavelength bands may include a first wavelength band of greater than or equal to 500 nm and less than or equal to 550 nm, and a second wavelength band of greater than or equal to 1000 nm and less than or equal to 1150 nm. Alternatively, in the laser processing device according to one aspect of the present invention, the plurality of wavelength bands may include a third wavelength band of greater than or equal to 1300 nm and less than or equal to 1400 nm. In these cases, the laser processing device is adaptable to each wavelength band. Note that, the laser light of the first wavelength band is suitable for internal absorption type laser processing on a substrate made of sapphire, for example. In addition, the laser light of each of the second wavelength band and the third wavelength band is suitable for internal absorption type laser processing for a substrate made of silicon, for example.

Advantageous Effects of Invention

According to one aspect of the present invention, a laser processing device can be provided adaptable to a plurality of wavelength bands.

BRIEF DESCRIPTION OF DRAWINGS

FIG. 13 is a sectional view of the laser converging unit taken along the line XIII-XIII of FIG. 12.

FIGS. 16(a) and 16(b) are a graph illustrating a reflectance characteristic of a reflective film illustrated in FIG. 15 and a graph illustrating a transmittance characteristic of an antireflective film provided on a front surface of a transparent substrate, respectively.

FIGS. 17(a) and 17(b) each are a graph illustrating distortion of a front surface of a pixel electrode illustrated in FIG. 15.

FIGS. 18(a) and 18(b) each are a diagram illustrating a distortion correction pattern displayed on a liquid crystal layer illustrated in FIG. 15.

FIGS. 19(a) and 19(b) each are a diagram illustrating a table in which a luminance value of an image signal and a phase modulation amount are associated with each other.

FIGS. 20(a) and 20(b) each are a diagram illustrating a table in which a luminance value of an image signal and a phase modulation amount are associated with each other.

DESCRIPTION OF EMBODIMENTS

Figure 1:
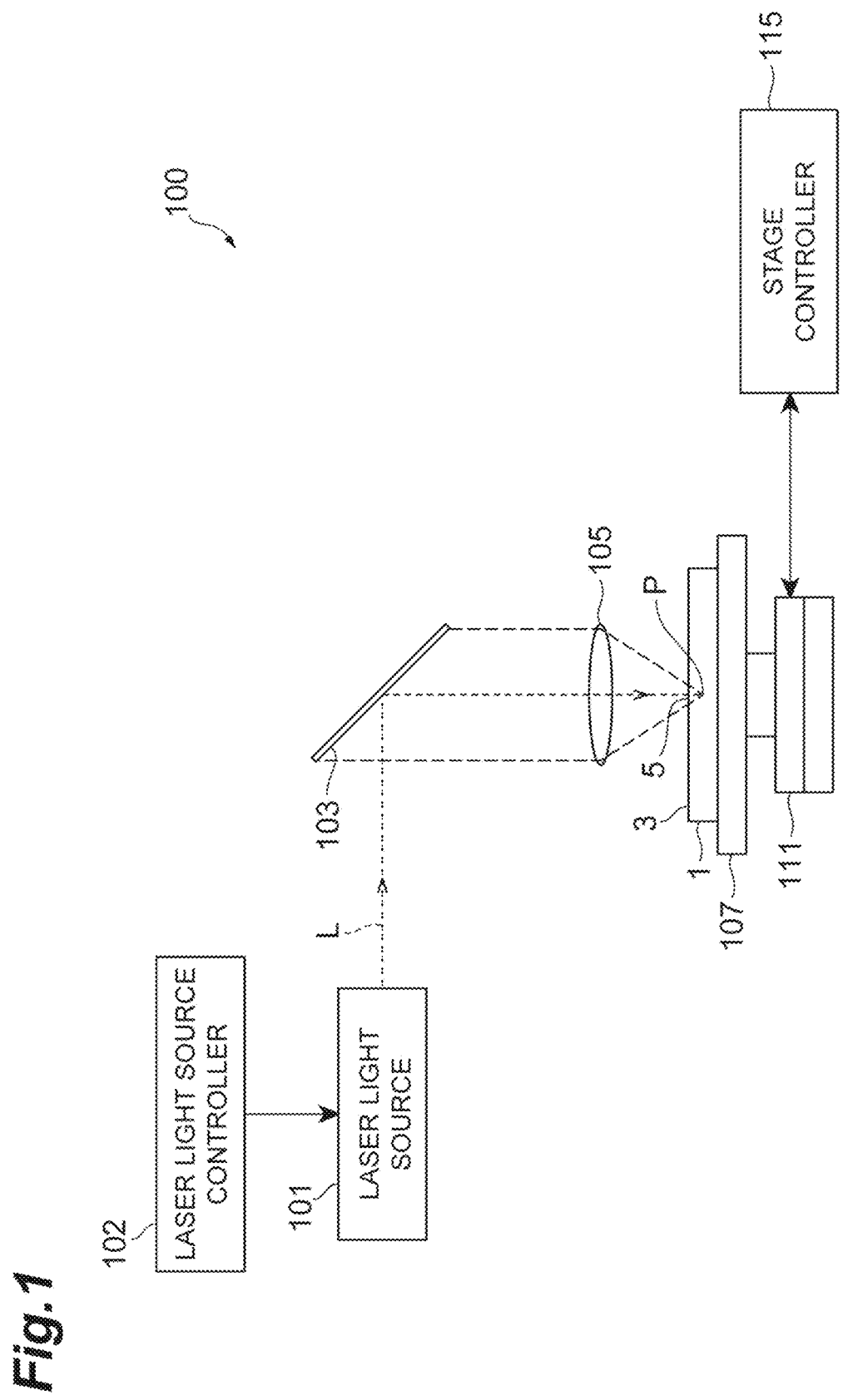
FIG. 1 is a schematic configuration diagram of a laser processing device used for forming a modified region.

In the following, one embodiment of one aspect of the present invention will be described in detail with reference to the drawings. In the drawings, the same elements or corresponding elements are denoted by the same reference numerals, and overlapping explanations may be omitted.

In a laser processing device according to the embodiment, laser light is converged at an object to be processed to form a modified region within the object to be processed along a line to cut. Therefore, formation of the modified region will be described at first with reference to FIGS. 1 to 6.

As illustrated in FIG. 1, a laser processing device 100 includes a laser light source 101 configured to cause laser light L to oscillate in a pulsating manner, a dichroic mirror 103 arranged so as to change a direction of the optical axis (optical path) of the laser light L by 90°, and a converging lens 105 configured to converge the laser light L. The laser processing device 100 further includes a support table 107 configured to support an object to be processed 1 that is an object to which the laser light L converged by the converging lens 105 is emitted, a stage 111 that is a moving mechanism configured to move the support table 107, a laser light source controller 102 configured to control the laser light source 101 in order to adjust the output, pulse width, pulse waveform, and the like of the laser light L, and a stage controller 115 configured to control the movement of the stage 111.

In the laser processing device 100, the laser light L emitted from the laser light source 101 changes the direction of its optical axis by 90° with the dichroic mirror 103 and then is converged by the converging lens 105 within the object to be processed 1 mounted on the support table 107. At the same time, the stage 111 is moved, so that the object to be processed 1 moves with respect to the laser light L along a line to cut 5. Thus, a modified region along the line to cut 5 is formed in the object to be processed 1. While the stage 111 is moved here for relatively moving the laser light L, the converging lens 105 may be moved instead or together therewith.

Figure 2:
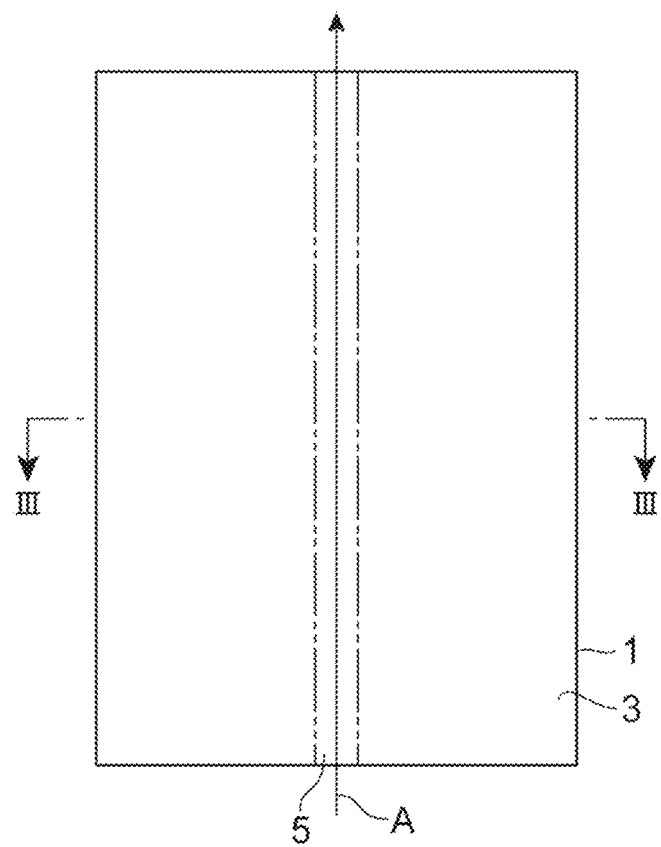
FIG. 2 is a plan view of an object to be processed for which the modified region is formed.
Figure 3:
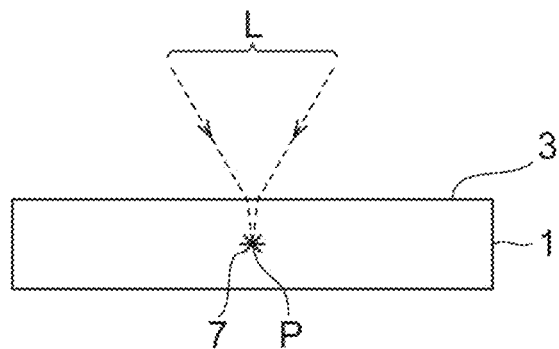
FIG. 3 is a sectional view of the object to be processed taken along the line of FIG. 2.
Figure 4:
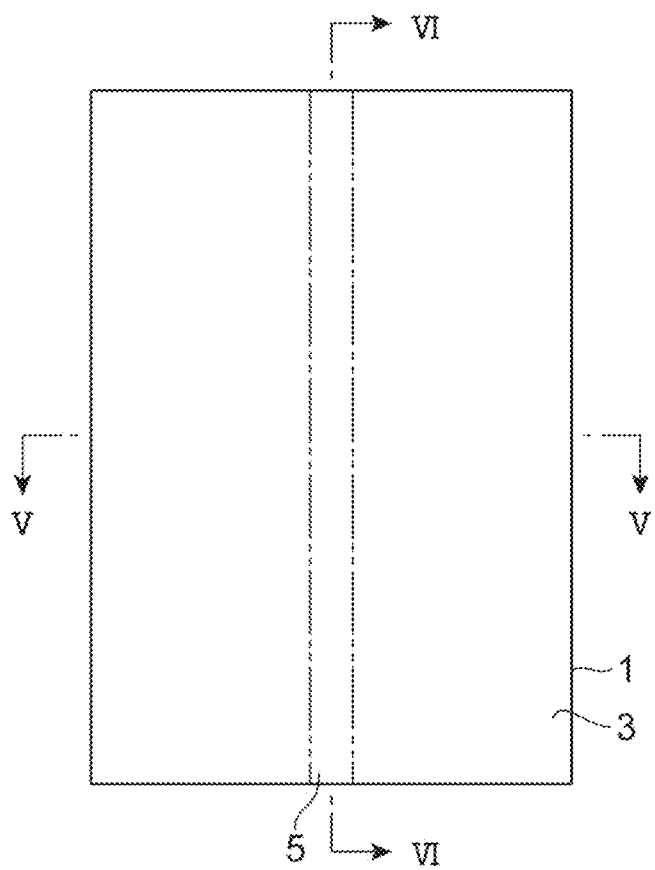
FIG. 4 is a plan view of the object to be processed after laser processing.
Figure 5:
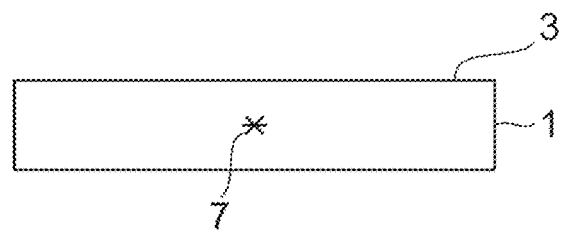
FIG. 5 is a sectional view of the object to be processed taken along the line V-V of FIG. 4.
Figure 6:
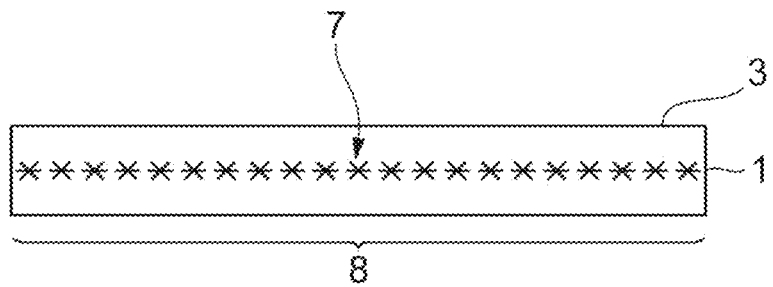
FIG. 6 is a sectional view of the object to be processed taken along the line VI-VI of FIG. 4.

Employed as the object to be processed 1 is a planar member (for example, a substrate or a wafer), examples of which include semiconductor substrates formed of semiconductor materials and piezoelectric substrates formed of piezoelectric materials. As illustrated in FIG. 2, in the object to be processed 1, the line to cut 5 is set for cutting the object to be processed 1. The line to cut 5 is a virtual line extending straight. In a case where a modified region is formed within the object to be processed 1, the laser light L is relatively moved along the line to cut 5 (that is, in the direction of arrow A in FIG. 2) while a converging point (converging position) P is set within the object to be processed 1 as illustrated in FIG. 3. Thus, a modified region 7 is formed within the object to be processed 1 along the line to cut 5 as illustrated in FIGS. 4, 5 and 6, and the modified region 7 formed along the line to cut 5 becomes a cutting start region 8. The line to cut 5 corresponds to an irradiation schedule line.

The converging point P is a position at which the laser light L is converged. The line to cut 5 may be curved instead of being straight, a three-dimensional one combining them, or one specified by coordinates. The line to cut 5 may be one actually drawn on a front surface 3 of the object to be processed 1 without being restricted to the virtual line. The modified region 7 may be formed either continuously or intermittently. The modified region 7 may be formed in either rows or dots, and only needs to be formed at least within the object to be processed 1, on the front surface 3, or on a back surface. A crack may be formed from the modified region 7 as a start point, and the crack and the modified region 7 may be exposed at an outer surface (the front surface 3, the back surface, or an outer peripheral surface) of the object to be processed 1. A laser light entrance surface in forming the modified region 7 is not limited to the front surface 3 of the object to be processed 1 but may be the back surface of the object to be processed 1.

Incidentally, in a case where the modified region 7 is formed within the object to be processed 1, the laser light L is transmitted through the object to be processed 1 and is particularly absorbed near the converging point P located within the object to be processed 1. Thus, the modified region 7 is formed in the object to be processed 1 (that is, internal absorption type laser processing). In this case, the front surface 3 of the object to be processed 1 hardly absorbs the laser light L and thus does not melt. On the other hand, in a case where the modified region 7 is formed on the front surface 3 or the back surface of the object to be processed 1, the laser light L is particularly absorbed near the converging point P located on the front surface 3 or the back surface, and removal portions such as holes and grooves are formed (surface absorption type laser processing) by being melted from the front surface 3 or the back surface and removed.

The modified region 7 is a region in which density, refractive index, mechanical strength and other physical characteristics are different from the surroundings. Examples of the modified region 7 include a molten processed region (meaning at least one of a region resolidified after having been once molten, a region in the molten state, and a region in the process of resolidifying from the molten state), a crack region, a dielectric breakdown region, a refractive index changed region, and a mixed region thereof. Other examples of the modified region 7 include a region where the density of the modified region 7 has changed compared to the density of an unmodified region in a material of the object to be processed 1, and a region formed with a lattice defect. In a case where the material of the object to be processed 1 is single crystal silicon, the modified region 7 can also be said to be a high dislocation density region.

The molten processed region, refractive index changed region, region where the density of the modified region 7 has changed compared to the density of the unmodified region, and region formed with the lattice defect may further incorporate the crack (cracking or microcrack) therewithin or at an interface between the modified region 7 and the unmodified region. The incorporated crack may be formed over the whole surface of the modified region 7 or in only a portion or a plurality of portions thereof. The object to be processed 1 includes a substrate made of a crystalline material having a crystal structure. For example, the object to be processed 1 includes a substrate formed of at least one of gallium nitride (GaN), silicon (Si), silicon carbide (SiC), LiTaO3, and sapphire (Al2O3). In other words, the object to be processed 1 includes, for example, a gallium nitride substrate, a silicon substrate, a SiC substrate, a LiTaO3 substrate, or a sapphire substrate. The crystalline material may be either an anisotropic crystal or an isotropic crystal. In addition, the object to be processed 1 may include a substrate made of a non-crystalline material having a non-crystalline structure (amorphous structure), and may include a glass substrate, for example.

In the embodiment, the modified region 7 can be formed by forming a plurality of modified spots (processing marks) along the line to cut 5. In this case, the plurality of modified spots gathers to be the modified region 7. Each of the modified spots is a modified portion formed by a shot of one pulse of pulsed laser light (that is, laser irradiation of one pulse: laser shot). Examples of the modified spots include crack spots, molten processed spots, refractive index changed spots, and those in which at least one of them is mixed. As for the modified spots, their sizes and lengths of the crack occurring therefrom can be controlled as necessary in view of the required cutting accuracy, the required flatness of cut surfaces, the thickness, kind, and crystal orientation of the object to be processed 1, and the like. In addition, in the embodiments, the modified spots can be formed as the modified region 7, along the line to cut 5.

[Laser Processing Device According to Embodiments]

Next, the laser processing device according to the embodiments will be described. In the following description, the directions orthogonal to each other in the horizontal plane are defined as the X-axis direction and the Y-axis direction, and the vertical direction is defined as the Z-axis direction.

[Overall Configuration of Laser Processing Device]

Figure 7:
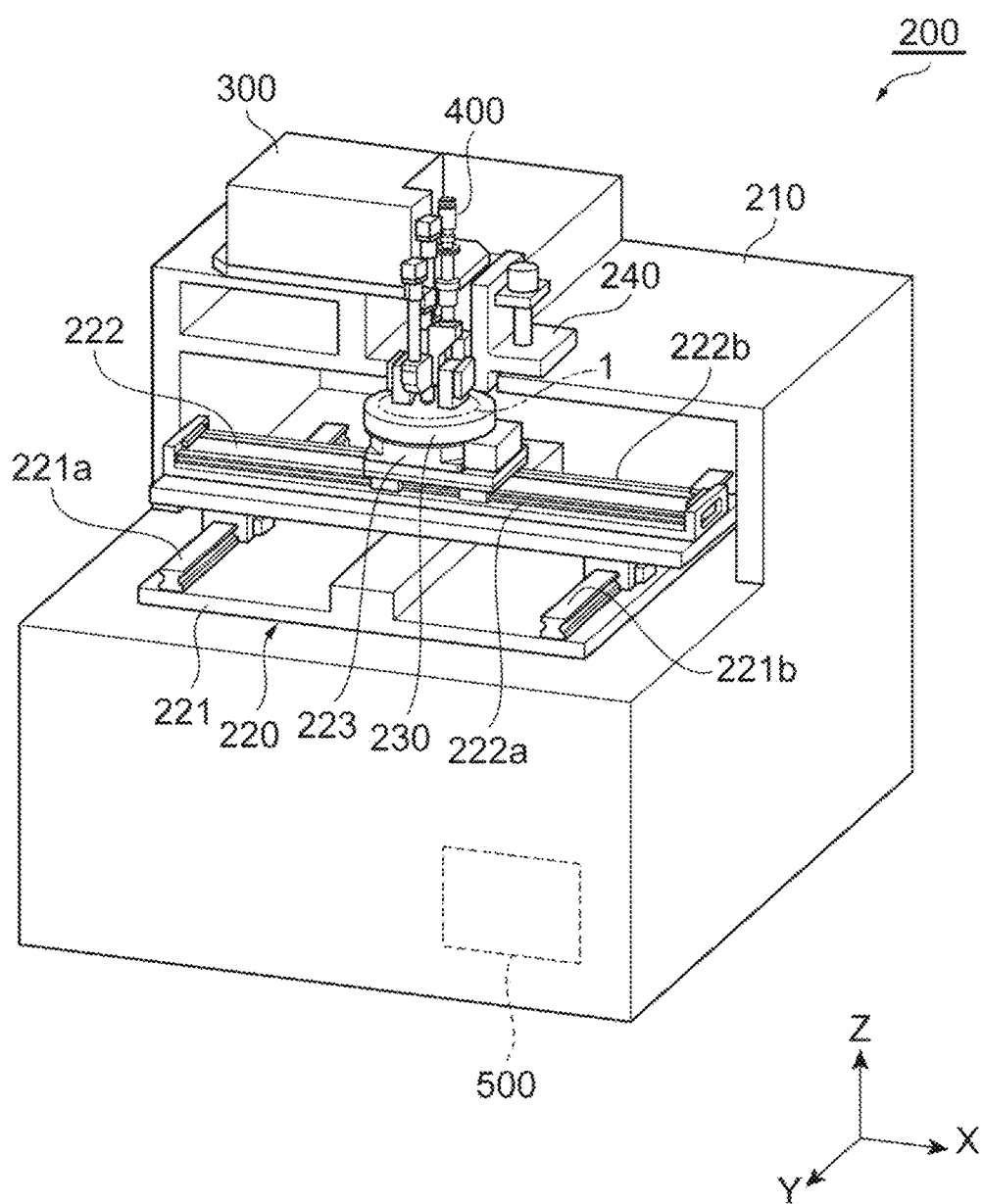
FIG. 7 is a perspective view of a laser processing device according to an embodiment.

As illustrated in FIG. 7, a laser processing device 200 includes a device frame 210, a first moving mechanism (moving mechanism) 220, a support table 230, and a second moving mechanism 240. Further, the laser processing device 200 includes a laser output unit 300, a laser converging unit 400, and a controller 500.

The first moving mechanism 220 is attached to the device frame 210. The first moving mechanism 220 includes a first rail unit 221, a second rail unit 222, and a movable base 223. The first rail unit 221 is attached to the device frame 210. The first rail unit 221 is provided with a pair of rails 221a and 221b extending along the Y-axis direction. The second rail unit 222 is attached to the pair of rails 221a and 221b of the first rail unit 221 so as to be movable along the Y-axis direction. The second rail unit 222 is provided with a pair of rails 222a and 222b extending along the X-axis direction. The movable base 223 is attached to the pair of rails 222a and 222b of the second rail unit 222 so as to be movable along the X-axis direction. The movable base 223 is rotatable about an axis parallel to the Z-axis direction as the center.

Figure 8:
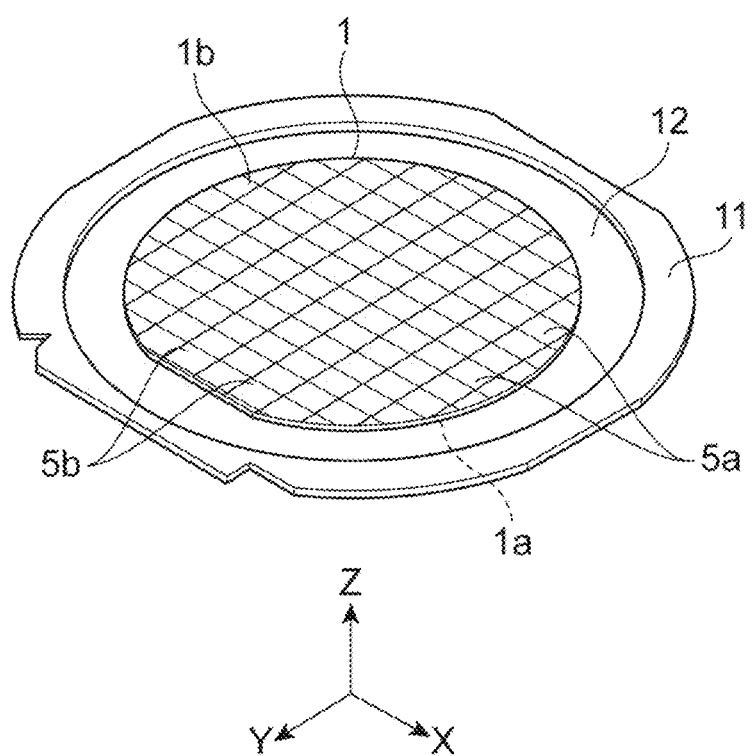
FIG. 8 is a perspective view of an object to be processed attached to a support table of the laser processing device of FIG. 7.

The support table 230 is attached to the movable base 223. The support table 230 supports the object to be processed 1. The object to be processed 1 includes a plurality of functional devices (a light receiving device such as a photodiode, a light emitting device such as a laser diode, a circuit device formed as a circuit, or the like) formed in a matrix shape on the front surface side of a substrate made of a semiconductor material such as silicon. When the object to be processed 1 is supported on the support table 230, as illustrated in FIG. 8, on a film 12 stretched over an annular frame 11, for example, a front surface 1a of the object to be processed 1 (a surface of the plurality of functional devices side) is pasted. The support table 230 holds the frame 11 with a clamp and suctions the film 12 with a vacuum chuck table, to support the object to be processed 1. On the support table 230, a plurality of lines to cut 5a parallel to each other and a plurality of lines to cut 5b parallel to each other are set in a grid pattern so as to pass between adjacent functional devices on the object to be processed 1.

As illustrated in FIG. 7, the support table 230 is moved along the Y-axis direction by operation of the second rail unit 222 in the first moving mechanism 220. In addition, the support table 230 is moved along the X-axis direction by operation of the movable base 223 in the first moving mechanism 220. Further, the support table 230 is rotated about the axis parallel to the Z-axis direction as the center by operation of the movable base 223 in the first moving mechanism 220. As described above, the support table 230 is attached to the device frame 210 to be movable along the X-axis direction and the Y-axis direction, and to be rotatable about the axis parallel to the Z-axis direction as the center.

The laser output unit 300 is attached to the device frame 210. The laser converging unit 400 is attached to the device frame 210 via the second moving mechanism 240. The laser converging unit 400 is moved along the Z-axis direction by operation of the second moving mechanism 240. As described above, the laser converging unit 400 is attached to the device frame 210 so as to be movable along the Z-axis direction with respect to the laser output unit 300.

The controller 500 includes a Central Processing Unit (CPU), Read Only Memory (ROM), Random Access Memory (RAM), and the like. The controller 500 controls operation of each unit of the laser processing device 200.

As an example, in the laser processing device 200, a modified region is formed within the object to be processed 1 along each of the lines to cut 5a and 5b (see FIG. 8) as follows.

First, the object to be processed 1 is supported on the support table 230 such that a back surface 1b (see FIG. 8) of the object to be processed 1 becomes the laser light entrance surface, and each of the lines to cut 5a of the object to be processed 1 is aligned in a direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5a. Thus, the modified region is formed within the object to be processed 1 along each of the lines to cut 5a.

When the formation of the modified region along each of the lines to cut 5a is completed, the support table 230 is rotated by the first moving mechanism 220, and each of the lines to cut 5b of the object to be processed 1 is aligned in the direction parallel to the X-axis direction. Subsequently, the laser converging unit 400 is moved by the second moving mechanism 240 such that the converging point of the laser light L is located at a position apart from the laser light entrance surface of the object to be processed 1 by a predetermined distance within the object to be processed 1. Subsequently, while a constant distance is maintained between the laser light entrance surface of the object to be processed 1 and the converging point of the laser light L, the converging point of the laser light L is relatively moved along each line to cut 5b. Thus, the modified region is formed within the object to be processed 1 along each line to cut 5b.

As described above, in the laser processing device 200, the direction parallel to the X-axis direction is a processing direction (scanning direction of the laser light L). Note that, the relative movement of the converging point of the laser light L along each line to cut 5a and the relative movement of the converging point of the laser light L along each line to cut 5b are performed by the movement of the support table 230 along the X-axis direction by the first moving mechanism 220. In addition, the relative movement of the converging point of the laser light L between the lines to cut 5a and the relative movement of the converging point of the laser light L between the lines to cut 5b are performed by the movement of the support table 230 along the Y-axis direction by the first moving mechanism 220.

Figure 9:
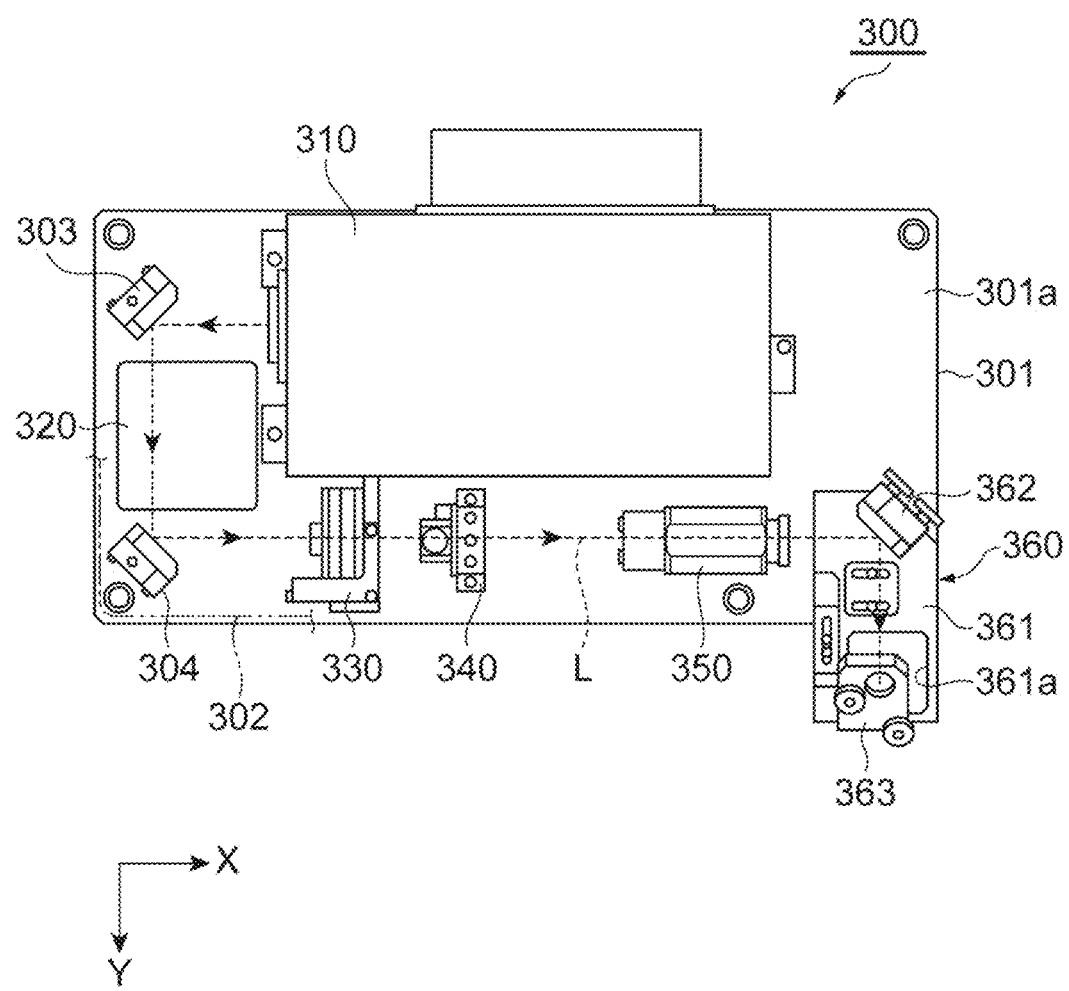
FIG. 9 is a sectional view of a laser output unit taken along the ZX plane of FIG. 7.

As illustrated in FIG. 9, the laser output unit 300 includes a mounting base 301, a cover 302, and a plurality of mirrors 303 and 304. Further, the laser output unit 300 includes a laser oscillator 310, a shutter 320, a $\lambda/2$ wave plate unit 330, a polarizing plate unit 340, a beam expander 350, and a mirror unit 360.

The mounting base 301 supports the plurality of mirrors 303 and 304, the laser oscillator 310, the shutter 320, the $\lambda/2$ wave plate unit 330, the polarizing plate unit 340, the beam expander 350, and the mirror unit 360. The plurality of mirrors 303 and 304, the laser oscillator 310, the shutter 320, the $\lambda/2$ wave plate unit 330, the polarizing plate unit 340, the beam expander 350, and the mirror unit 360 are attached to a main surface 301a of the mounting base 301. The mounting base 301 is a planar member and is detachable with respect to the device frame 210 (see FIG. 7). The laser output unit 300 is attached to the device frame 210 via the mounting base 301. That is, the laser output unit 300 is detachable with respect to the device frame 210.

The cover 302 covers the plurality of mirrors 303 and 304, the laser oscillator 310, the shutter 320, the $\lambda/2$ wave plate unit 330, the polarizing plate unit 340, the beam expander 350, and the mirror unit 360 on the main surface 301a of the mounting base 301. The cover 302 is detachable with respect to the mounting base 301.

The laser oscillator 310 oscillates linearly polarized laser light L in a pulsating manner along the X-axis direction. The wavelength of the laser light L emitted from the laser oscillator 310 is included in any of the wavelength bands of from 500 nm to 550 nm, from 1000 nm to 1150 nm, or from 1300 nm to 1400 nm. The laser light L in the wavelength band of from 500 nm to 550 nm is suitable for internal absorption type laser processing on a substrate made of sapphire, for example. The laser light L in each of the wavelength bands of from 1000 nm to 1150 nm and from 1300 nm to 1400 nm is suitable for internal absorption type laser processing for a substrate made of silicon, for example. The polarization direction of the laser light L emitted from the laser oscillator 310 is, for example, a direction parallel to the Y-axis direction. The laser light L emitted from the laser oscillator 310 is reflected by the mirror 303 and enters the shutter 320 along the Y-axis direction.

In the laser oscillator 310, ON/OFF of the output of the laser light L is switched as follows. In a case where the laser oscillator 310 includes a solid state laser, ON/OFF of a Q switch (acousto-optic modulator (AOM), electro-optic modulator (EOM), or the like) provided in a resonator is switched, whereby ON/OFF of the output of the laser light L is switched at high speed. In a case where the laser oscillator 310 includes a fiber laser, ON/OFF of the output of a semiconductor laser constituting a seed laser and an amplifier (excitation) laser is switched, whereby ON/OFF of the output of the laser light L is switched at high speed. In a case where the laser oscillator 310 uses an external modulation device, ON/OFF of the external modulation device (AOM, EOM, or the like) provided outside the resonator is switched, whereby ON/OFF of the output of the laser light L is switched at high speed.

The shutter 320 opens and closes the optical path of the laser light L by a mechanical mechanism. Switching ON/OFF of the output of the laser light L from the laser output unit 300 is performed by switching ON/OFF of the output of the laser light L in the laser oscillator 310 as described above, and the shutter 320 is provided, whereby the laser light L is prevented from being unexpectedly emitted from the laser output unit 300, for example. The laser light L having passed through the shutter 320 is reflected by the mirror 304 and sequentially enters the λ/2 wave plate unit 330 and the polarizing plate unit 340 along the X-axis direction.

The λ/2 wave plate unit 330 and the polarizing plate unit 340 function as the output adjusting unit configured to adjust the output (light intensity) of the laser light L. In addition, the λ/2 wave plate unit 330 and the polarizing plate unit 340 each function as the polarization direction adjusting unit configured to adjust the polarization direction of the laser light L. The laser light L having sequentially passed through the λ/2 wave plate unit 330 and the polarizing plate unit 340 enters the beam expander 350 along the X-axis direction.

The beam expander 350 collimates the laser light L while adjusting the diameter of the laser light L. The laser light L having passed through the beam expander 350 enters the mirror unit 360 along the X-axis direction.

The mirror unit 360 includes a support base 361 and a plurality of mirrors 362 and 363. The support base 361 supports the plurality of mirrors 362 and 363. The support base 361 is attached to the mounting base 301 so as to be position adjustable along the X-axis direction and the Y-axis direction. The mirror (first mirror) 362 reflects the laser light L having passed through the beam expander 350 in the Y-axis direction. The mirror 362 is attached to the support base 361 such that its reflective surface is angle adjustable around an axis parallel to the Z-axis, for example.

The mirror (second mirror) 363 reflects the laser light L reflected by the mirror 362 in the Z-axis direction. The mirror 363 is attached to the support base 361 such that its reflective surface is angle adjustable around an axis parallel to the X-axis, for example, and is position adjustable along the Y-axis direction. The laser light L reflected by the mirror 363 passes through an opening 361a formed in the support base 361 and enters the laser converging unit 400 (see FIG. 7) along the Z-axis direction. That is, an emission direction of the laser light L by the laser output unit 300 coincides with a moving direction of the laser converging unit 400. As described above, each of the mirrors 362 and 363 includes a mechanism configured to adjust the angle of the reflective surface.

In the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed, whereby the position and angle of the optical axis of the laser light L emitted from the laser output unit 300 are aligned with respect to the laser converging unit 400. That is, each of the plurality of mirrors 362 and 363 is a component configured to adjust the optical axis of the laser light L emitted from the laser output unit 300.

Figure 10:
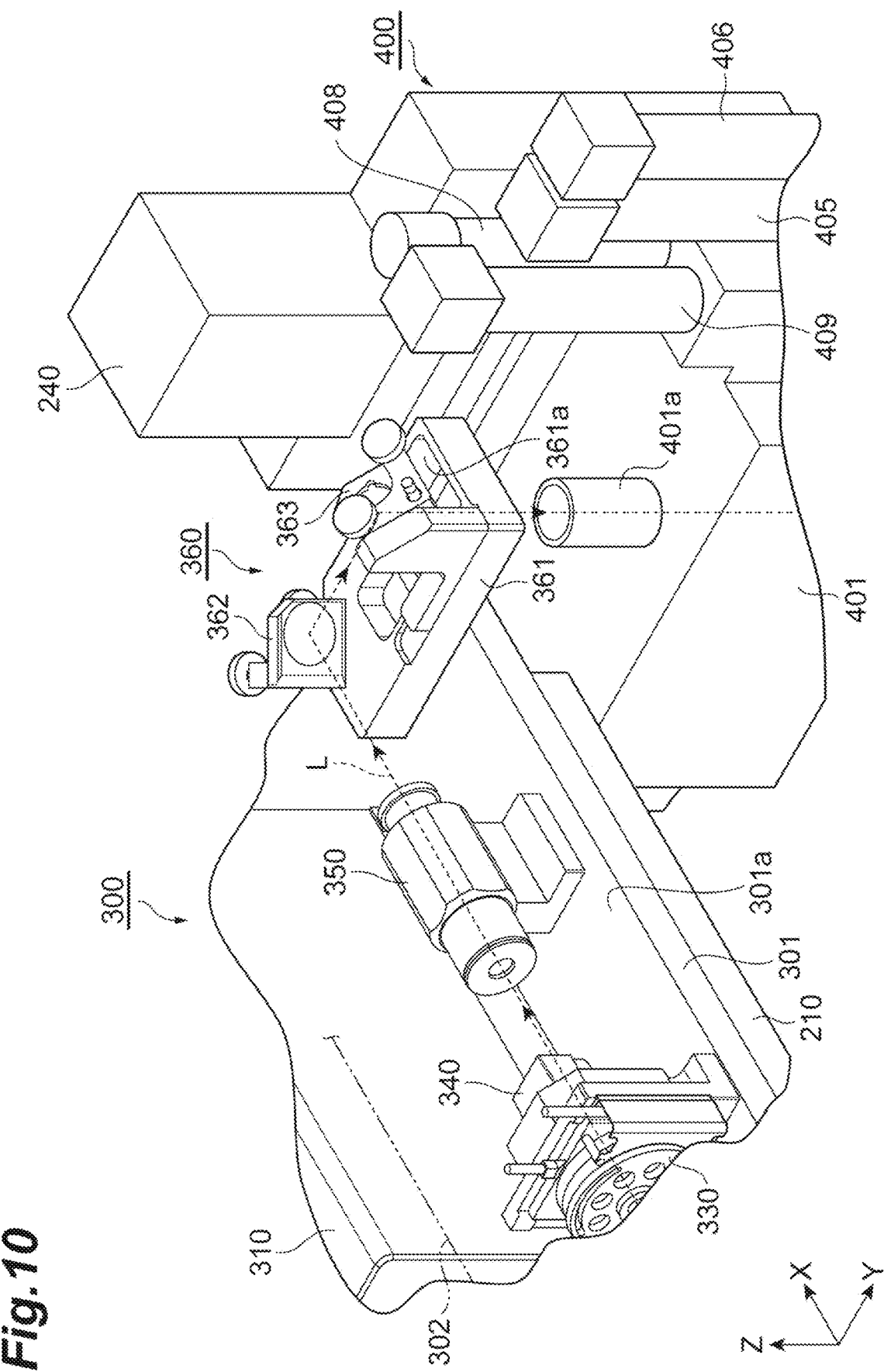
FIG. 10 is a perspective view of a part of the laser output unit and a laser converging unit in the laser processing device of FIG. 7.

As illustrated in FIG. 10, the laser converging unit 400 includes a housing 401. The housing 401 has a rectangular parallelepiped shape with the Y-axis direction as the longitudinal direction. The second moving mechanism 240 is attached to one side surface 401e of the housing 401 (see FIGS. 11 and 13). A cylindrical light entrance unit 401a is provided in the housing 401 so as to face the opening 361a of the mirror unit 360 in the Z-axis direction. The light entrance unit 401a allows the laser light L emitted from the laser output unit 300 to enter the housing 401. The mirror unit 360 and the light entrance unit 401a are separated from each other by a distance in which mutual contact does not occur when the laser converging unit 400 is moved along the Z-axis direction by the second moving mechanism 240.

Figure 11:
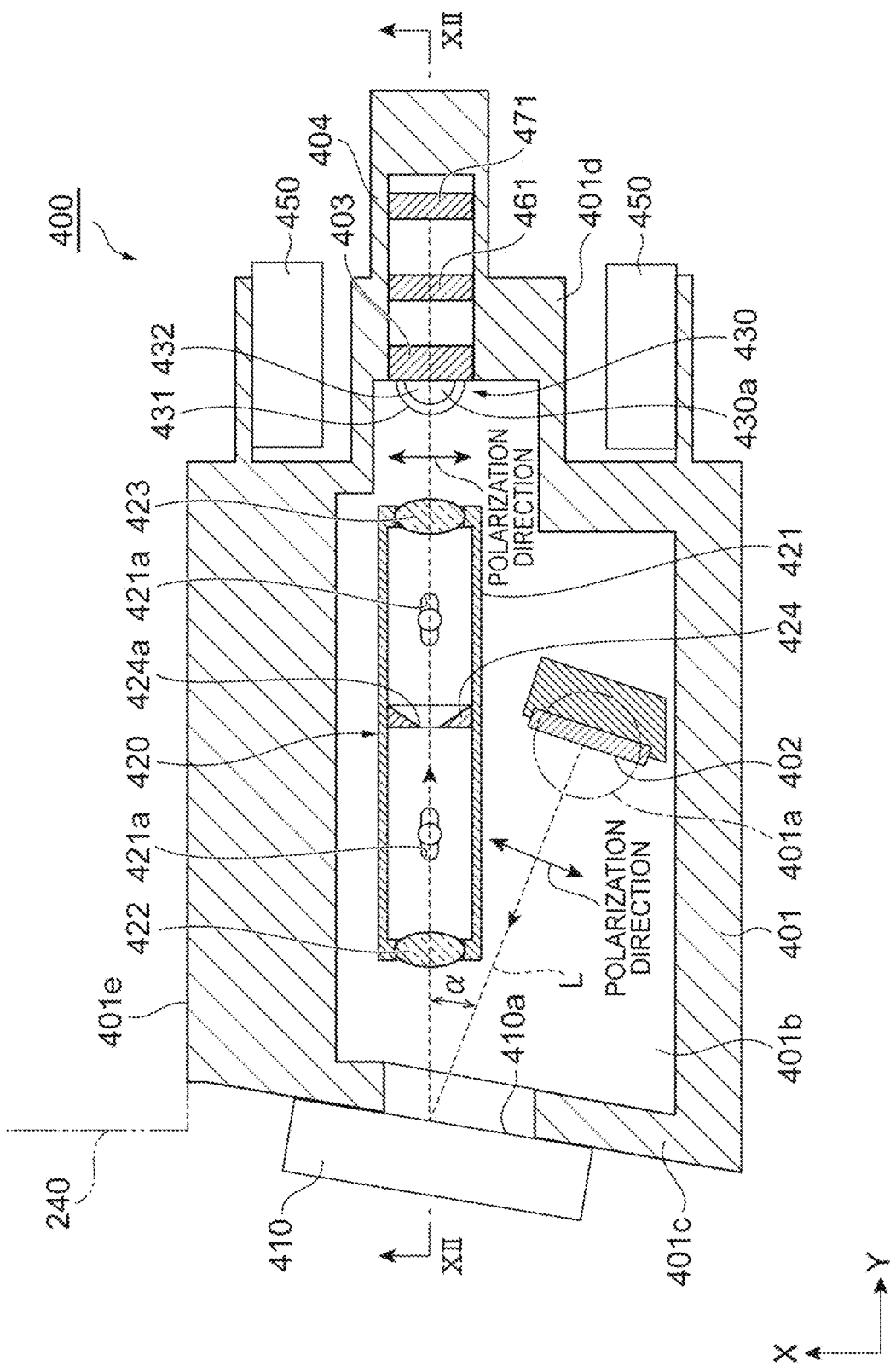
FIG. 11 is a sectional view of the laser converging unit taken along the XY plane of FIG. 7.
Figure 12:
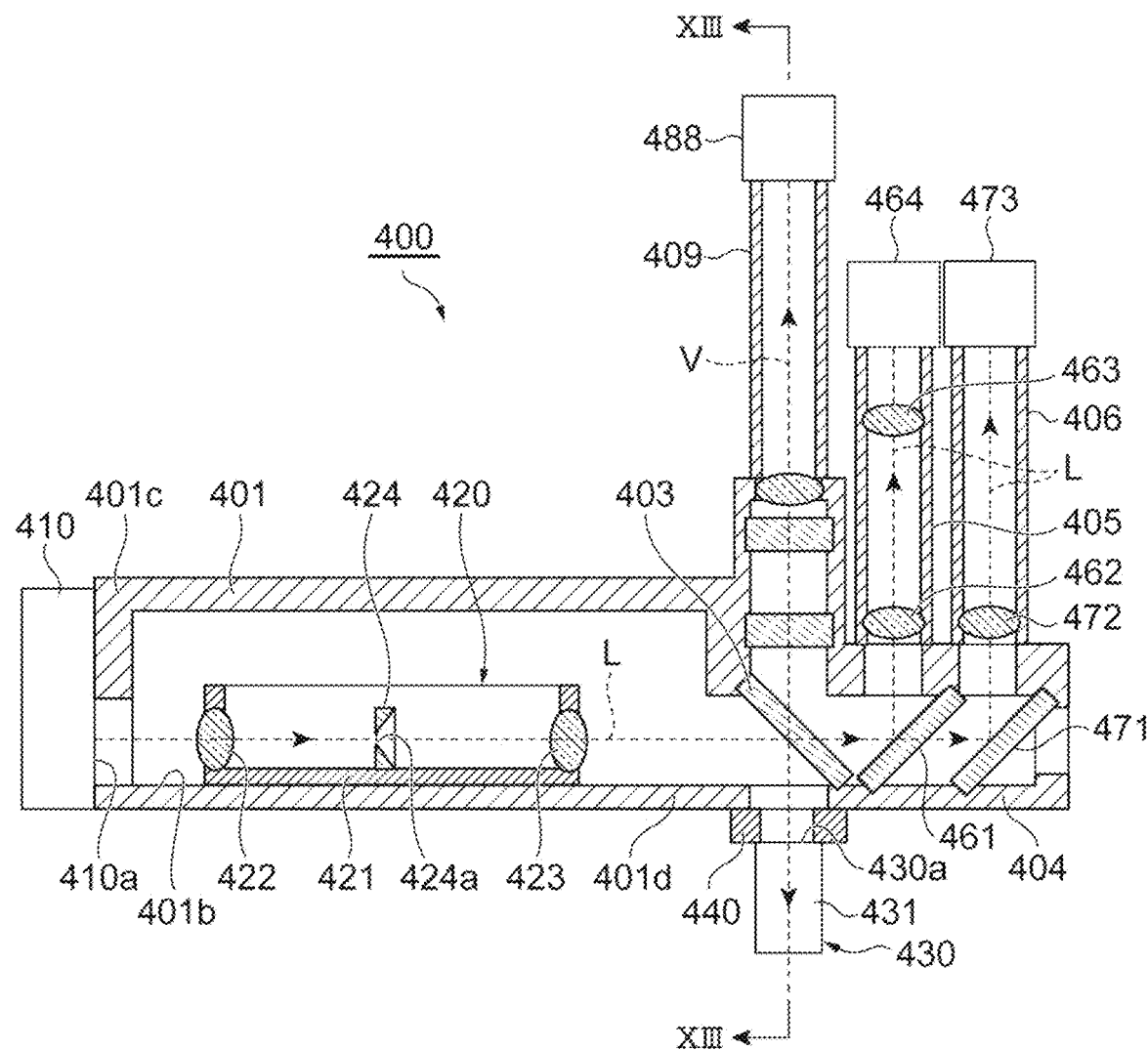
FIG. 12 is a sectional view of the laser converging unit taken along the line XII-XII of FIG. 11.

As illustrated in FIGS. 11 and 12, the laser converging unit 400 includes a mirror 402 and a dichroic mirror 403. Further, the laser converging unit 400 includes a reflective spatial light modulator 410, a 4f lens unit 420, a converging lens unit (objective lens) 430, a drive mechanism 440, and a pair of distance measuring sensors 450.

The mirror 402 is attached to a bottom surface 401b of the housing 401 so as to face the light entrance unit 401a in the Z-axis direction. The mirror 402 reflects the laser light L entering the housing 401 via the light entrance unit 401a in a direction parallel to the XY plane. The laser light L collimated by the beam expander 350 of the laser output unit 300 enters the mirror 402 along the Z-axis direction. That is, the laser light L as parallel light enters the mirror 402 along the Z-axis direction. For that reason, even if the laser converging unit 400 is moved along the Z-axis direction by the second moving mechanism 240, a constant state is maintained of the laser light L entering the mirror 402 along the Z-axis direction. The laser light L reflected by the mirror 402 enters the reflective spatial light modulator 410.

The reflective spatial light modulator 410 is attached to an end 401c of the housing 401 in the Y-axis direction in a state where the reflective surface 410a faces the inside of the housing 401. The reflective spatial light modulator 410 is, for example, a reflective liquid crystal (Liquid Crystal on Silicon (LCOS)) Spatial Light Modulator (SLM), and reflects the laser light L in the Y-axis direction while modulating the laser light L. The laser light L modulated and reflected by the reflective spatial light modulator 410 enters the 4f lens unit 420 along the Y-axis direction. Here, in a plane parallel to the XY plane, an angle α formed by an optical axis of the laser light L entering the reflective spatial light modulator 410 and an optical axis of the laser light L emitted from the reflective spatial light modulator 410, is an acute angle (for example, from 10° to 60°). That is, the laser light L is reflected at an acute angle along the XY plane in the reflective spatial light modulator 410. This is for suppressing an incident angle and a reflection angle of the laser light L to inhibit the degradation of diffraction efficiency, and for sufficiently exerting performance of the reflective spatial light modulator 410. Note that, in the reflective spatial light modulator 410, for example, the thickness of a light modulation layer in which a liquid crystal is used is extremely thin as several micrometers to several tens of micrometers, so that the reflective surface 410a can be regarded as substantially the same as a light entering and exiting surface of the light modulation layer.

The 4f lens unit 420 includes a holder 421, a lens 422 on the reflective spatial light modulator 410 side, a lens 423 on the converging lens unit 430 side, and a slit member 424. The holder 421 holds a pair of the lenses 422 and 423 and the slit member 424. The holder 421 maintains a constant mutual positional relationship between the pair of lenses 422 and 423 and the slit member 424 in a direction along the optical axis of the laser light L. The pair of lenses 422 and 423 constitutes a double telecentric optical system in which the reflective surface 410a of the reflective spatial light modulator 410 and an entrance pupil plane (pupil plane) 430a of the converging lens unit 430 are in an imaging relationship.

Thus, an image of the laser light L on the reflective surface 410a of the reflective spatial light modulator 410 (an image of the laser light L modulated in the reflective spatial light modulator 410) is transferred to (imaged on) the entrance pupil plane 430a of the converging lens unit 430. A slit 424a is formed in the slit member 424. The slit 424a is located between the lens 422 and the lens 423 and near a focal plane of the lens 422. Unnecessary part of the laser light L modulated and reflected by the reflective spatial light modulator 410 is blocked by the slit member 424. The laser light L having passed through the 4f lens unit 420 enters the dichroic mirror 403 along the Y-axis direction.

The dichroic mirror 403 reflects most (for example, from 95% to 99.5%) of the laser light L in the Z-axis direction and transmits part (for example, from 0.5% to 5%) of the laser light L along the Y-axis direction. Most of the laser light L is reflected at a right angle along the ZX plane in the dichroic mirror 403. The laser light L reflected by the dichroic mirror 403 enters the converging lens unit 430 along the Z-axis direction.

The converging lens unit 430 is attached to an end 401d (an end on the opposite side from the end 401c) of the housing 401 in the Y-axis direction via the drive mechanism 440. The converging lens unit 430 includes a holder 431 and a plurality of lenses 432. The holder 431 holds the plurality of lenses 432. The plurality of lenses 432 converges the laser light L at the object to be processed 1 (see FIG. 7) supported by the support table 230. The drive mechanism 440 moves the converging lens unit 430 along the Z-axis direction by driving force of a piezoelectric device.

The pair of distance measuring sensors 450 is attached to the end 401d of the housing 401 so as to be respectively located on both sides of the converging lens unit 430 in the X-axis direction. Each of the distance measuring sensors 450 emits light for distance measurement (for example, laser light) to the laser light entrance surface of the object to be processed 1 (see FIG. 7) supported by the support table 230, and detects the light for distance measurement reflected by the laser light entrance surface, thereby acquiring displacement data of the laser light entrance surface of the object to be processed 1. Note that, for the distance measuring sensors 450, sensors can be used of a triangulation method, a laser confocal method, a white confocal method, a spectral interference method, an astigmatism method, and the like.

In the laser processing device 200, as described above, the direction parallel to the X-axis direction is the processing direction (scanning direction of the laser light L). For that reason, when the converging point of the laser light L is relatively moved along each of the lines to cut 5a and 5b, out of the pair of distance measuring sensors 450, one of the distance measuring sensors 450 being relatively advanced with respect to the converging lens unit 430 acquires the displacement data of the laser light entrance surface of the object to be processed 1 along each of the lines to cut 5a and 5b. Then, the drive mechanism 440 moves the converging lens unit 430 along the Z-axis direction on the basis of the displacement data acquired by the distance measuring sensors 450 such that a constant distance is maintained between the laser light entrance surface of the object to be processed 1 and the converging point of the laser light L.

The laser converging unit 400 includes a beam splitter 461, a pair of lenses 462 and 463, and a profile acquisition camera (intensity distribution acquisition unit) 464. The beam splitter 461 divides the laser light L transmitted through the dichroic mirror 403 into a reflection component and a transmission component. The laser light L reflected by the beam splitter 461 sequentially enters the pair of lenses 462 and 463, and the profile acquisition camera 464 along the Z-axis direction. The pair of lenses 462 and 463 constitutes a double telecentric optical system in which the entrance pupil plane 430a of the converging lens unit 430 and an imaging surface of the profile acquisition camera 464 are in an imaging relationship. Thus, an image of the laser light L on the entrance pupil plane 430a of the converging lens unit 430 is transferred to (imaged on) the imaging surface of the profile acquisition camera 464. As described above, the image of the laser light L on the entrance pupil plane 430a of the converging lens unit 430 is the image of the laser light L modulated in the reflective spatial light modulator 410. Therefore, in the laser processing device 200, an imaging result by the profile acquisition camera 464 is monitored, whereby an operation state of the reflective spatial light modulator 410 can be grasped.

Further, the laser converging unit 400 includes a beam splitter 471, a lens 472, and a camera 473 for monitoring an optical axis position of the laser light L. The beam splitter 471 divides the laser light L transmitted through the beam splitter 461 into a reflection component and a transmission component. The laser light L reflected by the beam splitter 471 sequentially enters the lens 472 and the camera 473 along the Z-axis direction. The lens 472 converges the entering laser light L on an imaging surface of the camera 473. In the laser processing device 200, while an imaging result by each of the cameras 464 and 473 is monitored, in the mirror unit 360, the position adjustment of the support base 361 with respect to the mounting base 301, the position adjustment of the mirror 363 with respect to the support base 361, and the angle adjustment of the reflective surface of each of the mirrors 362 and 363 are performed (see FIGS. 9 and 10), whereby a shift can be corrected of the optical axis of the laser light L entering the converging lens unit 430 (a positional shift of intensity distribution of the laser light with respect to the converging lens unit 430, and an angular shift of the optical axis of the laser light L with respect to the converging lens unit 430).

The plurality of beam splitters 461 and 471 is arranged in a cylindrical body 404 extending along the Y-axis direction from the end 401d of the housing 401. The pair of lenses 462 and 463 is arranged in a cylindrical body 405 erected on the cylindrical body 404 along the Z-axis direction, and the profile acquisition camera 464 is arranged at an end of the cylindrical body 405. The lens 472 is arranged in a cylindrical body 406 erected on the cylindrical body 404 along the Z-axis direction, and the camera 473 is arranged at an end of the cylindrical body 406. The cylindrical body 405 and the cylindrical body 406 are arranged side by side in the Y-axis direction. Note that, the laser light L transmitted through the beam splitter 471 may be absorbed by a damper or the like provided at an end of the cylindrical body 404, or may be used for an appropriate purpose.

As illustrated in FIGS. 12 and 13, the laser converging unit 400 includes a visible light source 481, a plurality of lenses 482, a reticle 483, a mirror 484, a semitransparent mirror 485, a beam splitter 486, a lens 487, and an observation camera 488. The visible light source 481 emits visible light V along the Z-axis direction. The plurality of lenses 482 collimates the visible light V emitted from the visible light source 481. The reticle 483 gives a scale line to the visible light V. The mirror 484 reflects the visible light V collimated by the plurality of lenses 482 in the X-axis direction. The semitransparent mirror 485 divides the visible light V reflected by the mirror 484 into a reflection component and a transmission component. The visible light V reflected by the semitransparent mirror 485 is sequentially transmitted through the beam splitter 486 and the dichroic mirror 403 along the Z-axis direction, and is emitted via the converging lens unit 430 to the object to be processed 1 supported by the support table 230 (See FIG. 7).

The visible light V emitted to the object to be processed 1 is reflected by the laser light entrance surface of the object to be processed 1, enters the dichroic mirror 403 via the converging lens unit 430, and is transmitted through the dichroic mirror 403 along the Z-axis direction. The beam splitter 486 divides the visible light V transmitted through the dichroic mirror 403 into a reflection component and a transmission component. The visible light V transmitted through the beam splitter 486 is transmitted through the semitransparent mirror 485 and sequentially enters the lens 487 and the observation camera 488 along the Z-axis direction. The lens 487 converges the entering visible light V on an imaging surface of the observation camera 488. In the laser processing device 200, an imaging result by the observation camera 488 is observed, whereby a state of the object to be processed 1 can be grasped.

The mirror 484, the semitransparent mirror 485, and the beam splitter 486 are arranged in a holder 407 attached on the end 401d of the housing 401. The plurality of lenses 482 and the reticle 483 are arranged in a cylindrical body 408 erected on the holder 407 along the Z-axis direction, and the visible light source 481 is arranged at an end of the cylindrical body 408. The lens 487 is arranged in a cylindrical body 409 erected on the holder 407 along the Z-axis direction, and the observation camera 488 is arranged at an end of the cylindrical body 409. The cylindrical body 408 and the cylindrical body 409 are arranged side by side in the X-axis direction. Note that, each of the visible light V transmitted through the semitransparent mirror 485 along the X-axis direction and the visible light V reflected in the X-axis direction by the beam splitter 486 may be absorbed by a damper or the like provided on a wall portion of the holder 407, or may be used for an appropriate purpose.

In the laser processing device 200, replacement of the laser output unit 300 is assumed. This is because the wavelength of the laser light L suitable for processing varies depending on the specifications of the object to be processed 1, processing conditions, and the like. For that reason, a plurality of the laser output units 300 is prepared having respective wavelengths of emitting laser light L different from each other. Here, prepared are the laser output unit 300 in which the wavelength of the emitting laser light L is included in the wavelength band of from 500 nm to 550 nm, the laser output unit 300 in which the wavelength of the emitting laser light L is included in the wavelength band of from 1000 nm to 1150 nm, and the laser output unit 300 in which the wavelength of the emitting laser light L is included in the wavelength band of from 1300 nm to 1400 nm.

On the other hand, in the laser processing device 200, replacement of the laser converging unit 400 is not assumed. This is because the laser converging unit 400 is adapted to multiple wavelengths (adapted to a plurality of wavelength bands non-contiguous with each other). Specifically, the mirror 402, the reflective spatial light modulator 410, the pair of lenses 422 and 423 of the 4f lens unit 420, the dichroic mirror 403, the lens 432 of the converging lens unit 430, and the like are adapted to the multiple wavelengths.

Here, the laser converging unit 400 is adapted to the wavelength bands of from 500 nm to 550 nm, from 1000 nm to 1150 nm, and from 1300 nm to 1400 nm. This is implemented by designing the components of the laser converging unit 400 so as to satisfy desired optical performance, such as coating the components of the laser converging unit 400 with a predetermined dielectric multilayer film. Note that, in the laser output unit 300, the λ/2 wave plate unit 330 includes a λ/2 wave plate, and the polarizing plate unit 340 includes a polarizing plate. The λ/2 wave plate and the polarizing plate are optical devices having high wavelength dependence. For that reason, the λ/2 wave plate unit 330 and the polarizing plate unit 340 are provided in the laser output unit 300 as different components for each wavelength band.

[Optical Path and Polarization Direction of Laser Light in Laser Processing Device]

In the laser processing device 200, as illustrated in FIG. 11, the polarization direction of the laser light L converged at the object to be processed 1 supported by the support table 230 is a direction parallel to the X-axis direction, and coincides with the processing direction (scanning direction of the laser light L). Here, in the reflective spatial light modulator 410, the laser light L is reflected as P-polarized light. This is because in a case where a liquid crystal is used for the light modulation layer of the reflective spatial light modulator 410, when the liquid crystal is oriented such that the liquid crystal molecules are inclined in a surface parallel to the plane including the optical axis of the laser light L entering and exiting the reflective spatial light modulator 410, phase modulation is applied to the laser light L in a state where the rotation of the plane of polarization is inhibited (for example, see Japanese Patent No. 3878758).

On the other hand, in the dichroic mirror 403, the laser light L is reflected as S-polarized light. This is because, for example, when the laser light L is reflected as the S-polarized light rather than when the laser light L is reflected as the P-polarized light, the number of coatings is reduced of the dielectric multilayer film for making the dichroic mirror 403 adapt to the multiple wavelengths, and designing of the dichroic mirror 403 becomes easier.

Therefore, in the laser converging unit 400, the optical path from the mirror 402 via the reflective spatial light modulator 410 and the 4f lens unit 420 to the dichroic mirror 403 is set along the XY plane, and the optical path from the dichroic mirror 403 to the converging lens unit 430 is set along the Z-axis direction.

As illustrated in FIG. 9, in the laser output unit 300, the optical path of the laser light L is set along the X-axis direction or the Y-axis direction. Specifically, the optical path from the laser oscillator 310 to the mirror 303, and the optical path from the mirror 304 via the λ/2 wave plate unit 330, the polarizing plate unit 340, and the beam expander 350 to the mirror unit 360 are set along the X-axis direction, and the optical path from the mirror 303 via the shutter 320 to the mirror 304, and the optical path from the mirror 362 to the mirror 363 in the mirror unit 360 are set along the Y-axis direction.

Here, as illustrated in FIG. 11, the laser light L having traveled to the laser converging unit 400 from the laser output unit 300 along the Z-axis direction is reflected by the mirror 402 in a direction parallel to the XY plane, and enters the reflective spatial light modulator 410. At this time, in the plane parallel to the XY plane, an acute angle α is formed by the optical axis of the laser light L entering the reflective spatial light modulator 410 and the optical axis of the laser light L emitted from the reflective spatial light modulator 410. On the other hand, as described above, in the laser output unit 300, the optical path of the laser light L is set along the X-axis direction or the Y-axis direction.

Therefore, in the laser output unit 300, it is necessary to cause the λ/2 wave plate unit 330 and the polarizing plate unit 340 to function not only as the output adjusting unit configured to adjust the output of the laser light L but also as the polarization direction adjusting unit configured to adjust the polarization direction of the laser light L.

[4f Lens Unit]

Figure 14:
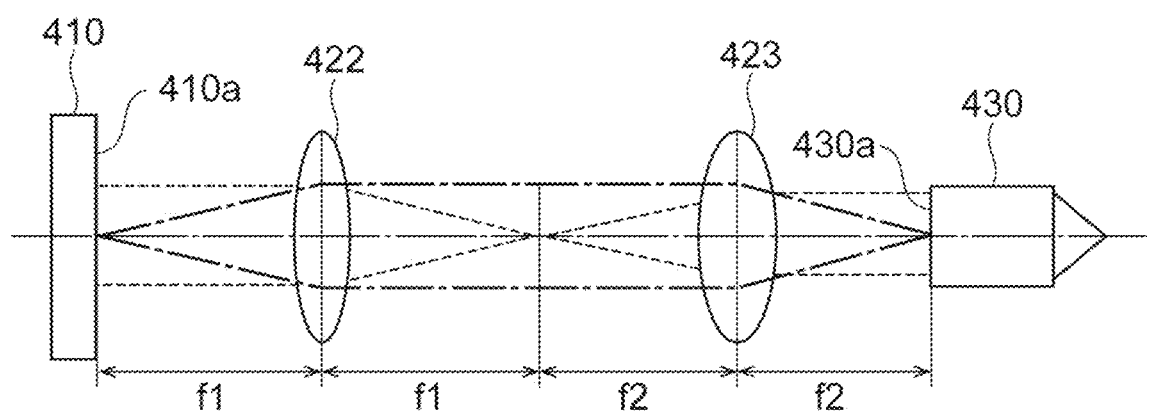
FIG. 14 is a diagram illustrating an optical arrangement relationship among a reflective spatial light modulator, a 4f lens unit, and a converging lens unit in the laser converging unit of FIG. 11.

As described above, the pair of lenses 422 and 423 of the 4f lens unit 420 constitutes the double telecentric optical system in which the reflective surface 410a of the reflective spatial light modulator 410 and the entrance pupil plane 430a of the converging lens unit 430 are in the imaging relationship. Specifically, as illustrated in FIG. 14, the distance of the optical path between the center of the lens 422 on the reflective spatial light modulator 410 side and the reflective surface 410a of the reflective spatial light modulator 410 is a first focal length f1 of the lens 422, the distance of the optical path between the center of the lens 423 on the converging lens unit 430 side and the entrance pupil plane 430a of the converging lens unit 430 is a second focal length f2 of the lens 423, and the distance of the optical path between the center of the lens 422 and the center of the lens 423 is a sum of the first focal length f1 and the second focal length f2 (that is, f1+f2). In the optical path from the reflective spatial light modulator 410 to the converging lens unit 430, the optical path between the pair of lenses 422 and 423 is a straight line.

In the laser processing device 200, from a viewpoint of increasing an effective diameter of the laser light L on the reflective surface 410a of the reflective spatial light modulator 410, a magnification M of the double telecentric optical system satisfies 0.5<M<1 (reduction system). As the effective diameter is increased of the laser light L on the reflective surface 410a of the reflective spatial light modulator 410, the laser light L is modulated with a high-precision phase pattern. From a viewpoint of inhibiting the optical path from becoming longer of the laser light L from the reflective spatial light modulator 410 to the converging lens unit 430, it is possible to set 0.6<M≤0.95. Here, (the magnification M of the double telecentric optical system)=(the size of the image on the entrance pupil plane 430a of the converging lens unit 430)/(the size of the object on the reflective surface 410a of the reflective spatial light modulator 410). In the case of the laser processing device 200, the magnification M of the double telecentric optical system, the first focal length f1 of the lens 422, and the second focal length f2 of the lens 423 satisfy M=f2/f1.

From a viewpoint of reducing the effective diameter of the laser light L on the reflective surface 410a of the reflective spatial light modulator 410, the magnification M of the double telecentric optical system may satisfy 1<M<2 (enlargement system). As the effective diameter is reduced of the laser light L on the reflective surface 410a of the reflective spatial light modulator 410, the magnification can be reduced of the beam expander 350 (see FIG. 9), and in the plane parallel to the XY plane, the angle α (see FIG. 11) is reduced formed by the optical axis of the laser light L entering the spatial light modulator 410 and the optical axis of the laser light L emitted from the reflective spatial light modulator 410. From the viewpoint of inhibiting the optical path from becoming longer of the laser light L from the reflective spatial light modulator 410 to the converging lens unit 430, it is possible to set 1.05≤M≤1.7.

[Reflective Spatial Light Modulator]

Figure 15:
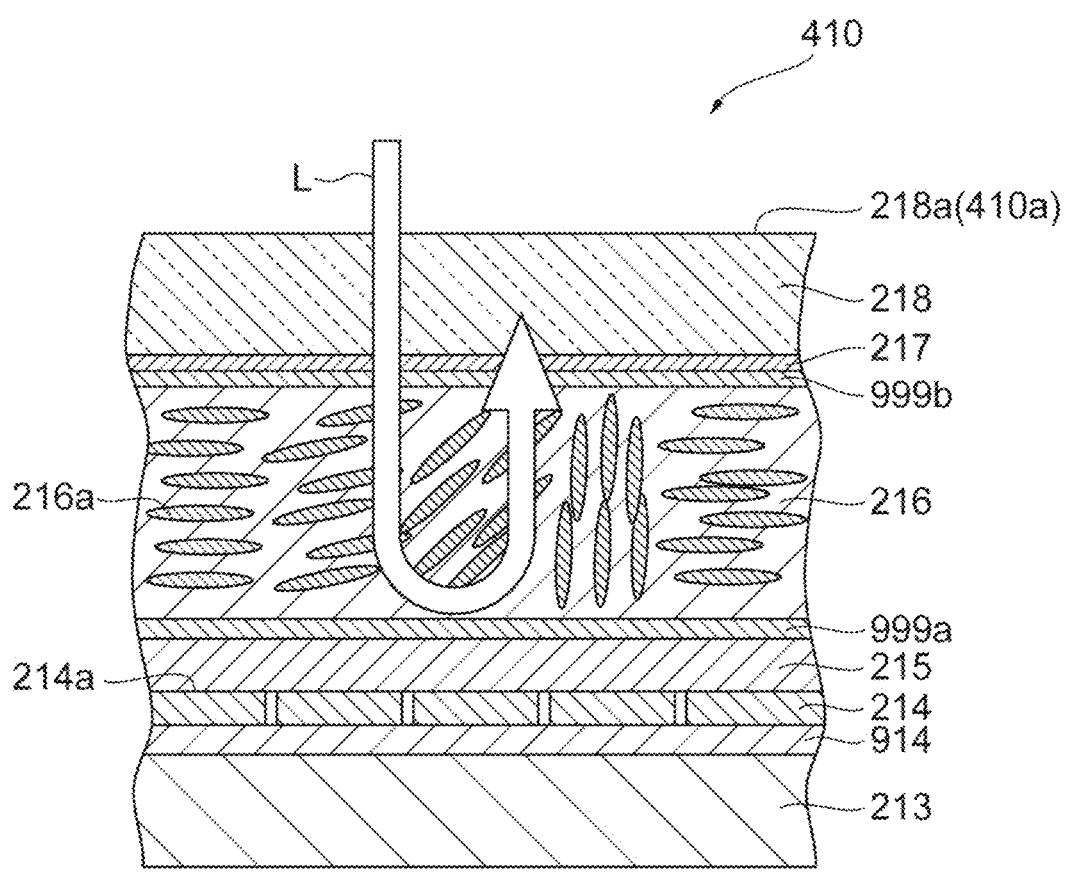
FIG. 15 is a partial sectional view of a reflective spatial light modulator in the laser processing device of FIG. 7.

As illustrated in FIG. 15, the reflective spatial light modulator 410 includes a silicon substrate 213, a drive circuit layer 914, a plurality of pixel electrodes 214, a reflective film 215 such as a dielectric multilayer mirror, an alignment film 999a, a liquid crystal layer (modulation layer) 216, an alignment film 999b, a transparent conductive film 217, and a transparent substrate 218 such as a glass substrate, which are layered in this order.

The transparent substrate 218 includes a front surface 218a. As described above, the front surface 218a can be regarded as substantially constituting the reflective surface 410a of the reflective spatial light modulator 410, but more specifically, the front surface 218a is an entrance surface at which the laser light L enters. That is, the transparent substrate 218 is made of a light transmitting material such as glass, for example, and transmits the laser light L entering from the front surface 218a of the reflective spatial light modulator 410 to the inside of the reflective spatial light modulator 410. The transparent conductive film 217 is formed on a back surface of the transparent substrate 218, and includes a conductive material (for example, ITO) which transmits therethrough the laser light L.

The plurality of pixel electrodes 214 is arranged in a matrix on the silicon substrate 213 along the transparent conductive film 217. Each pixel electrode 214 is made of a metal material such as aluminum, for example, while its front surface 214a is processed flat and smooth. The front surface 214a reflects the laser light L entering from the front surface 218a of the transparent substrate 218 toward the front surface 218a. That is, the reflective spatial light modulator 410 includes the front surface 218a at which the laser light L enters, and the front surface 214a configured to reflect the laser light L entering from the front surface 218a, toward the front surface 218a. The plurality of pixel electrodes 214 are driven by an active matrix circuit provided in the drive circuit layer 914.

The active matrix circuit is provided between the plurality of pixel electrodes 214 and the silicon substrate 213, and controls an applied voltage to each of the pixel electrodes 214 in accordance with a light image to be output from the reflective spatial light modulator 410. Such an active matrix circuit includes a first driver circuit configured to control the applied voltage for pixel rows arranged in the X-axis direction, and a second driver circuit configured to control the applied voltage for pixel rows arranged in the Y-axis direction, which are not illustrated, for example, and a predetermined voltage is applied to the pixel electrode 214 of a pixel specified by the driver circuits, by the controller 500.

The alignment films 999a, 999b are arranged on both end surfaces of the liquid crystal layer 216, respectively, so as to align a group of liquid crystal molecules in a fixed direction. The alignment films 999a, 999b are made of a polymer material such as polyimide, of which surfaces coming into contact with the liquid crystal layer 216 are subjected to rubbing, and the like.

The liquid crystal layer 216 is arranged between the plurality of pixel electrodes 214 and the transparent conductive film 217 and modulates the laser light L according to an electric field formed between each pixel electrode 214 and the transparent conductive film 217. That is, when a voltage is applied to the pixel electrodes 214 by the active matrix circuit of the drive circuit layer 914, an electric field is formed between the transparent conductive film 217 and the pixel electrodes 214, and the alignment direction of liquid crystal molecules 216a changes according to a magnitude of the electric field formed in the liquid crystal layer 216. When the laser light L enters the liquid crystal layer 216 through the transparent substrate 218 and the transparent conductive film 217, the laser light L is modulated by the liquid crystal molecules 216a while passing through the liquid crystal layer 216, and reflected by the reflective film 215, and then modulated again by the liquid crystal layer 216, and emitted.

At this time, the voltage applied to each of the pixel electrodes 214 is controlled by the controller 500, and, in accordance with the voltage, a refractive index changes in a portion sandwiched between the transparent conductive film 217 and each of the pixel electrodes 214 in the liquid crystal layer 216 (the refractive index changes of the liquid crystal layer 216 at a position corresponding to each pixel). Due to the change in the refractive index, the phase of the laser light L can be changed for each pixel of the liquid crystal layer 216 in accordance with the voltage applied. That is, phase modulation corresponding to the hologram pattern can be applied by the liquid crystal layer 216 for each pixel.

In other words, a modulation pattern as the hologram pattern applying the modulation can be displayed on the liquid crystal layer 216 of the reflective spatial light modulator 410. The wavefront is adjusted of the laser light L that enters and is transmitted through the modulation pattern, and shifts occur in phases of components of individual rays constituting the laser light L in a predetermined direction orthogonal to their traveling direction. Therefore, the laser light L can be modulated (for example, intensity, amplitude, phase, and polarization of the laser light L can be modulated) by appropriately setting the modulation pattern to be displayed in the reflective spatial light modulator 410.

In other words, depending on the voltage applied to each pixel electrode 214, a refractive index distribution is generated in the liquid crystal layer 216 along the arrangement direction of the pixel electrodes 214, and a phase pattern that can apply phase modulation to the laser light L is displayed on the liquid crystal layer 216. That is, the reflective spatial light modulator 410 includes the liquid crystal layer (modulation layer) 216 arranged between the front surface 218a and the front surface 214a and configured to display the phase pattern to modulate the laser light L.

Subsequently, the reflective spatial light modulator 410 will be described in more detail. The reflective spatial light modulator 410 is configured to be adaptable to the plurality of wavelength bands non-contiguous with each other (multi-wavelength adaptable) such as a first wavelength band of greater than or equal to 500 nm and less than or equal to 550 nm, a second wavelength band of greater than or equal to 1000 nm and less than or equal to 1150 nm, and a third wavelength band of greater than or equal to 1300 nm and less than or equal to 1400 nm. For that reason, on the front surface 214a of the pixel electrode 214, the reflective film 215 is formed, and the reflective film 215 is a dielectric multilayer film having a high reflectance region in the plurality of wavelength bands. FIG. 16(a) is a diagram illustrating an example of a reflectance characteristic of the reflective film 215. As illustrated in FIG. 16(a), here, the reflective film 215 has a high reflectance region RR1 corresponding to the first wavelength band, a high reflectance region RR2 corresponding to the second wavelength band, and a high reflectance region RR3 corresponding to the third wavelength band.

Low reflectance regions are respectively formed between the high reflectance regions RR1 to RR3. Thus, the high reflectance regions RR1 to RR3 are non-contiguous with each other in a high reflectance range. Here, the high reflectance region is a region where the reflectance is greater than or equal to 95%. Therefore, here, the low reflectance region is a region where the reflectance is less than 95%. Note that, as described above, the reflective film 215 has the plural high reflectance regions RR1 to RR3 non-contiguous with each other (in the high reflectance range), but it is also possible to make the high reflectance region RR1 to the high reflectance region RR3 contiguous in the high reflectance range. That is, as an example, the reflective film 215 can also be configured to have a high reflectance over the entire wavelength range from 500 nm that is the lower limit of the first wavelength band to 1400 nm that is the upper limit of the third wavelength band. However, in this case, the number of dielectric multilayer films increases, and the film thickness of the reflective film 215 increases. As a result, a large voltage is required to display a predetermined phase pattern in the liquid crystal layer 216. Therefore, as described above, it is advantageous to set only the respective target wavelength bands (the first wavelength band to the third wavelength band) to the high reflectance, to suppress the increase in the film thickness of the dielectric multilayer film.

On the front surface 218a of the transparent substrate 218, an antireflective film (not illustrated) is formed having a high transmittance region in the plurality of wavelength bands. FIG. 16(b) is a diagram illustrating an example of a transmittance characteristic of the antireflective film. As illustrated in FIG. 16(b), the antireflective film provided on the front surface 218a has a high transmittance region TR1 corresponding to the first wavelength band, a high transmittance region TR2 corresponding to the second wavelength band, and a high transmittance region TR3 corresponding to the third wavelength band. Note that, in FIG. 16(b), the solid line illustrates a transmittance range of 0% to 100% (vertical axis on the left side), and the broken line illustrates a transmittance range of 90% to 100% (vertical axis on the right side). In addition, the high transmittance region here is a region where the transmittance is approximately greater than or equal to 98%.

Here, the front surface 214a of the pixel electrode 214 has a predetermined flatness. That is, the front surface 214a may have a predetermined distortion. When the front surface 214a is distorted, distortion is also applied to the wavefront of the laser light L reflected by the front surface 214a. For this reason, the laser processing device 200 includes a distortion correction pattern that is a phase pattern for correcting distortion of the wavefront. FIG. 17(a) is a graph illustrating an example of the distortion. In the example of FIG. 17(a), a case is illustrated in which the distortion occurs over the front surface 214a of the plurality of pixel electrodes 214 depending on a warp of the silicon substrate 213, for example.

FIG. 17(b) is a graph in which an amount of distortion in FIG. 17(a) is divided by the wavelength of the laser light L so as to obtain an amount of distortion converted into the wavelength. In addition, in FIG. 17(b), the horizontal axis is converted into the pixel number (pixel position) of the pixel electrode 214. As illustrated in FIG. 17(b), for the amount of distortion converted into the wavelength, fold-backs S1 and S2 are formed at each one wavelength ($2\pi$). For this reason, in the case of being converted into the wavelength, the amount of distortion at each pixel varies between those of when the wavelength of the laser light L is 1064 nm (solid line) and when the wavelength of the laser light L is 532 nm (broken line), for example. That is, different phase modulation amounts (that is, distortion correction patterns) are required depending on the wavelength of the laser light L.

FIG. 18(a) illustrates a distortion correction pattern for a wavelength of 1064 nm, and FIG. 18(b) illustrates a distortion correction pattern for a wavelength of 532 nm. Note that, actually, FIGS. 18(a) and 18(b) each illustrate an image signal for displaying the distortion correction pattern on the liquid crystal layer 216. In the image signal, the distribution of the luminance value corresponds to the distribution of the refractive index of the liquid crystal layer 216 via the voltage. Therefore, the image signal of each of FIGS. 18(a) and 18(b) is equivalent to the phase pattern (distortion correction pattern). As illustrated in FIGS. 18(a) and 18(b), the distortion correction pattern for the wavelength of 1064 nm includes a pattern corresponding to the fold-back S1, whereas the distortion correction pattern for the wavelength of 532 nm includes patterns respectively corresponding to the fold-backs S1 and S2 (the fold-back period is half).

As described above, the laser processing device 200 holds the distortion correction pattern different for each of the plurality of wavelength bands (that is, includes a pattern holding unit). The pattern holding unit may be configured in the controller 500 or in the reflective spatial light modulator 410. Here, at least distortion correction patterns are held corresponding to three wavelength bands of the first wavelength band, the second wavelength band, and the third wavelength band. Each of the distortion correction patterns is a pattern obtained by converting a distortion correction amount into each wavelength, that is, a pattern in which the fold-backs S1 and S2 of the distortion correction amount (phase modulation amount) are formed at a period corresponding to the wavelength.

Here, the laser processing device 200 includes a table (hereinafter referred to as "Look-Up table (LUT)") in which the luminance value of the image signal for forming the phase pattern in the liquid crystal layer 216 and the phase modulation amount of the phase pattern are associated with each other. Subsequently, the LUT will be described. FIG. 19(a) is a diagram illustrating an example of a relationship between the voltage applied to the liquid crystal layer 216 and the phase modulation amount (wavelength indication) applied to the laser light L by the liquid crystal layer 216. FIG. 19(b) is a diagram illustrating an example of the LUT. As illustrated in FIG. 19(a), for example, to apply a phase modulation for one wavelength (1064 nm) to the laser light L having a wavelength of 1064 nm, it is sufficient that a voltage of approximately 2 V is applied to the liquid crystal layer 216.

Therefore, as illustrated by the solid line in FIG. 19(b), by assigning the voltages of 0 V to 2 V to the luminance value of 256 gradations of the image signal, the phase modulation amounts of 0 to a (for one wavelength) of the laser light L of 1064 nm and the luminance values of 256 gradations can be associated with each other. On the other hand, as illustrated in FIG. 19(a), to apply a phase modulation for one wavelength (532 nm) to the laser light L having a wavelength of 532 nm, it is sufficient that a voltage smaller than 2 V (for example, about 1.2 V) is applied to the liquid crystal layer 216. Note that, the phase modulation amount is not an absolute amount but a difference. For that reason, it is also possible to use a region of about 2.4 V to 3.5 V in the laser light of 532 nm, as the LUT, for example. Since the characteristics such as the response speed of the liquid crystal change in the voltage range to be used, it is possible to use the optimum voltage range depending on the application.

Therefore, as described above, if the voltages of 0 V to 2 V are assigned to the luminance values of 256 gradations of the image signal, as illustrated in FIG. 19(b), for the laser light L of 532 nm, phase modulation amounts (for example, 4π) larger than 2π (one wavelength) are associated with the luminance values of 256 gradations. Therefore, for the phase modulation amounts for 2π (one wavelength) of the effective laser light L of 532 nm, luminance values are used of smaller gradations than 256 gradations (for example, 128 grayscales). For this reason, when the same LUT is used for the plural wavelengths, the reproducibility degrades of the wavefront after modulation of the laser light L having a relatively short wavelength among the plural wavelengths.

To cope with this, the laser processing device 200 holds the LUT different for each of the wavelength bands. As an example, the laser processing device 200 holds a LUT (see FIG. 20(a)) in which the phase modulation amounts of 0 to 2π (for one wavelength) of the laser light L of 1064 nm and the luminance values of 256 gradations are associated with each other by assigning the voltages of 0 V to 2 V to the luminance values of 256 gradations of the image signal as described above, and a LUT (see FIG. 20(b)) in which the phase modulation amounts of 0 to 2π (one wavelength) of the laser light L of 532 nm and the luminance values of 256 gradations are associated with each other by assigning voltages of 0 V to 1.2 V to the luminance values of 256 gradations of the image signal. The LUTs in FIGS. 20(a) and 20(b) can be expressed differently from each other by displaying the wavelength on the vertical axis.

As described above, the laser processing device 200 holds the LUT different for each of the wavelength bands (that is, includes a table holding unit). The table holding unit may be configured in the controller 500 or in the reflective spatial light modulator 410. Here, at least LUTs are held corresponding to three wavelength bands of the first wavelength band, the second wavelength band, and the third wavelength band. In each LUT, for the shorter wavelength band, smaller phase modulation amounts converted into the wavelength are associated with the luminance values of certain gradations (here, 256 gradations).

As described above, in the laser processing device 200, the laser light L is modulated in accordance with the phase pattern of the reflective spatial light modulator 410, and then converged by the converging lens unit 430 toward the object to be processed 1. The reflective spatial light modulator 410 includes the front surface 218a of the transparent substrate 218 at which the laser light L enters, the front surface 214a of the pixel electrode 214 configured to reflect the laser light L entering from the front surface 218a, and the liquid crystal layer 216 arranged between the front surface 218a and the front surface 214a.

When entering from the front surface 218a and passing through the liquid crystal layer 216, the laser light L is modulated in accordance with the phase pattern. In addition, the laser light L is modulated also when being reflected by the front surface 214a and again passing through the liquid crystal layer 216, and is emitted from the reflective spatial light modulator 410. Here, on the front surface 214a, the reflective film 215 is formed that is a dielectric multilayer film having the high reflectance regions RR1 to RR3 in the plurality of wavelength bands non-contiguous with each other. Therefore, with the reflective spatial light modulator 410, it is possible to modulate the laser light L while reducing the loss on the front surface 214a of the laser light L of the plurality of wavelength bands. Accordingly, the laser processing device 200 is adaptable to the plurality of wavelength bands.

The laser processing device 200 includes the pattern holding unit (for example, the controller 500) configured to hold the distortion correction pattern as the phase pattern for correcting distortion given to the wavefront of the laser light L depending on the flatness of the front surface 214a of the pixel electrode 214. The pattern holding unit holds the distortion correction pattern different for each of the wavelength bands. As described above, the front surface 214a of the pixel electrode 214 has a predetermined flatness for each reflective spatial light modulator 410. However, to correct the distortion given to the wavefront of the laser light L depending on the flatness, the phase modulation amount is required different depending on the wavelength. Therefore, as described above, if the distortion correction pattern is held different for each of the wavelength bands, the laser processing device is easily and reliably adaptable to the plurality of wavelength bands.

The laser processing device 200 includes the table holding unit (for example, the controller 500) configured to hold the LUT in which the luminance value of the image signal for displaying the phase pattern on the liquid crystal layer 216 and the phase modulation amount of the phase pattern are associated with each other. The table holding unit holds the LUT different for each of the wavelength bands. As described above, for the laser light L of a certain wavelength, the LUT is prepared in which the luminance values of, for example, 256 gradations of the image signal are assigned to (associated with) the phase modulation amounts for one wavelength ($2\pi$), whereby a phase modulation pattern suitable for the wavelength can be easily displayed on the liquid crystal layer 216.

However, if the same LUT is used for the laser light L having a wavelength shorter than the wavelength, luminance values of smaller gradations are used for the phase modulation amounts for one wavelength, so that reproducibility drops of the wavefront after the modulation. To cope with this, the laser processing device 200 holds the LUT different for each of the wavelength bands. For this reason, it is possible to use a LUT suitable for each wavelength band, and degradation of the reproducibility of the wavefront can be suppressed.

Further, in the laser processing device 200, on the front surface 218a of the transparent substrate 218, the antireflective film is formed having the high transmittance regions TR1 to TR3 in the plurality of wavelength bands. For this reason, the loss of the laser light L can be further reduced, and the laser processing device is reliably adaptable to the plurality of wavelength bands.

The above is one embodiment of one aspect of the present invention. One aspect of the present invention is not limited to the above-described embodiment, but may be modified within a range not changing the gist of each claim, or may be applied to another.

For example, the above-described embodiment is not limited to one configured to form the modified region 7 within the object to be processed 1, and may be one configured to perform another laser processing such as ablation. The above-described embodiment is not limited to a laser processing device used for laser processing of converging the laser light L within the object to be processed 1, and may be a laser processing device used for laser processing of converging the laser light L at the front surface 1a, 3 or the back surface 1b of the object to be processed 1.

In the above embodiment, the imaging optical system constituting the double telecentric optical system in which the reflective surface 410a of the reflective spatial light modulator 410 and the entrance pupil plane 430a of the converging lens unit 430 are in the imaging relationship is not limited to the pair of lenses 422 and 423, and may be one including the first lens system (for example, a doublet, three or more lenses, or the like) on the reflective spatial light modulator 410 side, and the second lens system (for example, a doublet, three or more lenses, or the like) on the converging lens unit 430 side, or the like.

In the laser converging unit 400, the dichroic mirror 403 is the mirror configured to reflect the laser light L having passed through the pair of lenses 422 and 423 toward the converging lens unit 430; however, the mirror may be a total reflection mirror.

The converging lens unit 430 and the pair of distance measuring sensors 450 are attached to the end 401d of the housing 401 in the Y-axis direction; however, the converging lens unit 430 and the pair of distance measuring sensors 450 only need to be attached at a side closer to the end 401d from the center position of the housing 401 in the Y-axis direction. The reflective spatial light modulator 410 is attached to the end 401c of the housing 401 in the Y-axis direction; however, the reflective spatial light modulator 410 only need to be attached at a side closer to the end 401c from the center position of the housing 401 in the Y-axis direction. In addition, the distance measuring sensors 450 may be arranged only on one side of the converging lens unit 430 in the X-axis direction.

INDUSTRIAL APPLICABILITY

A laser processing device can be provided adaptable to a plurality of wavelength bands.

REFERENCE SIGNS LIST 1 object to be processed
100, 200 laser processing device
214a front surface (reflective surface)
215 reflective film (dielectric multilayer film)
216 liquid crystal layer (modulation layer)
218a front surface (entrance surface)
300 laser output unit
410 reflective spatial light modulator (spatial light modulator)
430 converging lens unit (objective lens)
500 controller (pattern holding unit, table holding unit)
L laser light.

The invention claimed is:

1. A laser processing device configured to emit laser light on an object to perform laser processing of the object, the laser processing device comprising:
   a laser output unit configured to output the laser light;
   a spatial light modulator configured to reflect the laser light output from the laser output unit while modulating the laser light in accordance with a phase pattern, wherein
      the spatial light modulator includes an entrance surface at which the laser light enters, a reflective surface configured to reflect the laser light entering from the entrance surface toward the entrance surface, and a modulation layer arranged between the entrance surface and the reflective surface and configured to display the phase pattern to modulate the laser light,
      a dielectric multilayer film having a high reflectance region in a plurality of wavelength bands non-contiguous with each other is formed on the reflective surface,
      the plurality of wavelength bands includes a first wavelength band of greater than or equal to 500 nm and less than or equal to 550 nm, and a second wavelength band of greater than or equal to 1000 nm and less than or equal to 1150 nm,
      an antireflective film having a high transmittance region in the plurality of wavelength bands is formed on the entrance surface, and the spatial light modulator reflects the laser light as P-polarized light;

an objective lens configured to converge the laser light from the spatial light modulator toward the object;

a dichroic mirror configured to reflect the laser light from the spatial light modulator toward the objective lens, wherein the dichroic mirror reflects the laser light as S-polarized light;

a pattern holding unit configured to hold, for each of the plurality of wavelength bands, a distortion correction pattern as the phase pattern for correcting distortion given to a wavefront of the laser light depending on flatness of the reflective surface, wherein the pattern holding unit holds the distortion correction pattern different for each of the plurality of wavelength bands; and a table holding unit configured to hold, for each of the plurality of wavelength bands, a table in which luminance values of an image signal for displaying the phase pattern on the modulation layer and phase modulation amounts of the phase pattern are associated with each other, wherein the laser processing device includes a device frame, the laser output unit includes a laser oscillator configured to oscillate the laser light having the first wavelength band or the laser light having the second wavelength band, the laser output unit includes a λ/2 wave plate unit, and a polarizing plate unit on which the laser light is incident, the laser output unit includes a mounting base configured to support the laser oscillator, the λ/2 wave plate unit, and the polarizing plate unit, the laser output unit is attached to the device frame via the mounting base, and is adapted to be detachable from the device frame with the mounting base, the laser processing device has a laser converging unit including a housing, the spatial light modulator, the dichroic mirror, and the objective lens, the spatial light modulator, the dichroic mirror, and the objective lens are fixed on the housing of the laser converging unit, the laser processing device includes a moving mechanism configured to move the laser converging unit along a Z-axis direction, the dichroic mirror and the objective lens are adapted to the first wavelength band and the second wavelength band by having a coating of the dielectric multilayer film, the table holding unit holds the table different for each of the plurality of wavelength bands, in the table corresponding to the first wavelength band, the phase modulation amounts associated with a specified range of the luminance values are smaller than the phase modulation amounts associated with the specified range of the luminance values in the table corresponding to the second wavelength band, and a range of an applied voltage of the modulation layer which is assigned to the specified range of the luminance values in the first wavelength band is narrower than a range of the applied voltage of the modulation layer which is assigned to the specified range of the luminance values in the second wavelength band.

2. The laser processing device according to claim 1, wherein the plurality of wavelength bands includes a third wavelength band of greater than or equal to 1300 nm and less than or equal to 1400 nm, and in the table corresponding to the third wavelength band, the phase modulation amounts associated with the specified range of the luminance values are larger than the phase modulation amounts associated with the specified range of the luminance values in the tables corresponding to the first and second wavelength bands.

* * * * *